United States Patent
He et al.

(10) Patent No.: US 9,666,865 B2
(45) Date of Patent: *May 30, 2017

(54) MAGNESIUM-SULFUR SECONDARY BATTERY CONTAINING A METAL POLYSULFIDE-PRELOADED ACTIVE CATHODE LAYER

(71) Applicant: Nanotek Instruments, Inc., Dayton, OH (US)

(72) Inventors: Hui He, Dayton, OH (US); Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 187 days.

This patent is subject to a terminal disclaimer.

(21) Appl. No.: 14/545,279

(22) Filed: Apr. 17, 2015

(65) Prior Publication Data

US 2016/0308208 A1 Oct. 20, 2016

(51) Int. Cl.
| | | |
|---|---|---|
| *H01M 6/12* | (2006.01) | |
| *H01M 4/58* | (2010.01) | |
| *H01M 4/38* | (2006.01) | |
| *H01M 4/62* | (2006.01) | |
| *H01M 2/16* | (2006.01) | |

(Continued)

(52) U.S. Cl.
CPC ....... *H01M 4/5815* (2013.01); *H01M 2/1673* (2013.01); *H01M 4/136* (2013.01);
(Continued)

(58) Field of Classification Search
USPC .......................... 429/199, 162, 328
See application file for complete search history.

(56) References Cited

U.S. PATENT DOCUMENTS

| | | | | |
|---|---|---|---|---|
| 6,210,831 B1 * | 4/2001 | Gorkovenko | ....... | H01M 4/0485 429/213 |
| 7,071,258 B1 * | 7/2006 | Jang | ...................... | B82Y 30/00 423/445 B |

(Continued)

FOREIGN PATENT DOCUMENTS

WO  WO2015185754  * 12/2015

OTHER PUBLICATIONS

U.S. Appl. No. 11/509,424, filed Aug. 25, 2006, B. Z. Jang, et al.

(Continued)

*Primary Examiner* — Nina Bhat

(57) ABSTRACT

A rechargeable magnesium-sulfur cell comprising an anode layer, an electrolyte, a metal polysulfide-preloaded active cathode layer, wherein the active cathode layer comprises: (a) an integral porous structure having massive surfaces (specific surface area >100 $m^2/g$) or pores with a size from 1.0 nm to 100 nm and wherein multiple particles; and (b) a metal polysulfide, $M_xS_y$, preloaded in the pores or deposited on the massive surfaces, wherein x is an integer from 1 to 3 and y is an integer from 1 to 10, and M is a metal element selected from an alkali metal, an alkaline metal, a transition metal, a metal from groups 13 to 17 of the periodic table, or a combination thereof. The metal polysulfide is in a form of solid-state thin coating or small particles with a thickness or diameter less than 50 nm.

22 Claims, 14 Drawing Sheets

(51) Int. Cl.

| | | |
|---|---|---|
| *H01M 10/054* | (2010.01) | |
| *H01M 10/0568* | (2010.01) | |
| *H01M 4/136* | (2010.01) | |
| *H01M 4/66* | (2006.01) | |
| *H01M 4/80* | (2006.01) | |
| *H01M 4/02* | (2006.01) | |

(52) U.S. Cl.
CPC .............. *H01M 4/38* (2013.01); *H01M 4/622* (2013.01); *H01M 4/625* (2013.01); *H01M 4/66* (2013.01); *H01M 4/80* (2013.01); *H01M 10/054* (2013.01); *H01M 10/0568* (2013.01); *H01M 2004/021* (2013.01); *H01M 2004/028* (2013.01); *H01M 2220/20* (2013.01); *H01M 2300/0037* (2013.01)

(56) References Cited

U.S. PATENT DOCUMENTS

| | | | |
|---|---|---|---|
| 2012/0088154 A1 | 4/2012 | Liu et al. | |
| 2012/0119161 A1* | 5/2012 | Son | H01B 1/122 252/506 |
| 2013/0171339 A1 | 7/2013 | Wang et al. | |
| 2014/0234702 A1* | 8/2014 | Zhang | H01M 4/583 429/199 |

OTHER PUBLICATIONS

Xiulei Ji, Kyu Tae Lee, & Linda F. Nazar, "A highly ordered nanostructured carbon-sulphur cathode for lithium-sulphur batteries," Nature Materials 8, 500-506 (2009).

* cited by examiner

MAGNESIUM-SULFUR SECONDARY BATTERY CONTAINING A METAL POLYSULFIDE-PRELOADED ACTIVE CATHODE LAYER

FIELD OF THE INVENTION

The present invention is directed at a rechargeable magnesium-sulfur cell, also referred to as the Mg—S secondary cell.

BACKGROUND

With the rapid development of hybrid (HEY), plug-in hybrid electric vehicles (HEV), and all-battery electric vehicles (EV), there is an urgent need for a rechargeable battery having a high specific energy, high energy density, high rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode active materials. The lithium-sulfur cell operates with a redox couple, described by the reaction $S_8+16Li \leftrightarrow 8Li_2S$ that lies near 2.2 V with respect to $Li^+/Li^0$. This electrochemical potential is approximately ⅔ of that exhibited by conventional positive electrodes (e.g. $LiMnO_4$) of a lithium-ion battery. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

Despite its considerable advantages, the Li—S cell is plagued with several major technical problems that have thus far hindered its widespread commercialization:
(1) Lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact with active cell components, fouling of the anode surface, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12/2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g(S wt.) at 0.1 C rate, dropped to <580 mAh/g at 1.0 C rate). Again, this implies that a large proportion of S did not contribute to the lithium storage, resulting in a low S utilization efficiency.

Furthermore, all of the aforementioned methods involve depositing S particles onto surfaces of isolated graphene sheets. The presence of S particles or coating (one of the most insulating materials) adhered to graphene surfaces would make the resulting electrode structure non-conducting when multiple S-bonded graphene sheets are packed together. These S particles prevent graphene sheets from contacting each other, making it impossible for otherwise conducting graphene sheets to form a 3-D network of electron-conducting paths in the cathode. This unintended and unexpected outcome is another reason why these prior art Li—S cells have performed so poorly.

Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electro-active cathode materials (S utilization efficiency), and provide rechargeable Li—S cells with high capacities over a large number of cycles.

Hence, there has been strong and continued demand for batteries capable of storing more energy (Wh/l or Wh/kg) and delivering more power (W/kg or W/l) than current rechargeable Li-ion batteries and Li—S batteries. One possible route to meeting this demand is to utilize divalent magnesium ion ($Mg^{2+}$), rather than the monovalent lithium cation ($Li^+$) because magnesium enables nearly twice as much charge to be transferred, per weight or volume, as $Li^+$ thus enabling higher energy density. Further, magnesium metal and Mg-containing alloys or compounds are more abundant and readily available, potentially enabling significant cost reduction relative to Li metal batteries. Unfortunately, in general, the cathode active materials capable of storing Mg ions exhibit even lower specific capacity (typically <200 mAh/g and more typically <150 mAh/g) as compared to the current cathode active materials for lithium-ion cells. These cathode active materials proposed for use in a Mg-ion cell include: Chevrel phase $Mo_6S_8$, $MnO_2$, $CuS$, $Cu_2S$, $Ag_2S$, $CrS_2$, and $VOPO_4$; layered compounds $TiS_2$, $V_2O_5$, $MgVO_3$, $MoS_2$, $MgV_2O_5$, and $MoO_3$; Spinel structured compounds $CuCr_2S_4$, $MgCr_2S_4$, $MgMn_2O_4$, and $Mg_2MnO_4$; NASICON structured compounds $MgFe_2(PO_4)_3$ and $MgV_2(PO_4)_3$; Olivine structured compounds $MgMnSiO_4$ and $MgFe_2(PO_4)_2$; Tavorite structured compound $Mg_{0.5}VPO_4F$; pyrophosphates $TiP_2O_7$ and $VP_2O_7$; and $FeF_3$.

In comparison with the aforementioned compounds, sulfur remains a prime candidate cathode active material for a Mg metal secondary battery using Mg metal (>99.9% Mg) or lightly alloyed Mg metal (containing 70-99.9% Mg in the alloy) as the anode active material. In other words, Mg—S would be an ideal high-energy cell. However, the Mg—S cell is not without a problem. In fact, the Mg—S cell has even more problems than the Li—S cell does. There are some similar issues between Mg—S and Li—S batteries, such as: (i) low active material utilization rate, (ii) poor cycle life, and (iii) low Coulombic efficiency. Again, these drawbacks arise mainly from insulating nature of S, dissolution of S and metal polysulfide intermediates in liquid electrolytes (and related Shuttle effect), and large volume change during battery charging/discharging.

However, there are very serious issues that are unique to Mg—S batteries that Li—S batteries do not have: (a) The Li metal at the anode of the Li—S cell can form a passivating layer that is permeable to $Li^+$ ions, but the passivating layer on the Mg metal at the anode of the Mg—S cell is not permeable to the $Mg^{2+}$ ions, making the dissolution/re-plating of $Mg^{2+}$ ions (discharge/re-charge of the Mg metal secondary battery) difficult or impossible in most of the known electrolytes; (b) Due to this reason, there are only a limited number of electrolytes that are compatible with Mg metal at the anode; and (c) Unfortunately, these electrolytes are nucleophilic, making them incompatible with the electrophilic sulfur cathode, which is known to require a non-nucleophilic electrolyte.

Hence, a specific object of the present invention is to provide a rechargeable magnesium-sulfur cell based on rational materials and battery designs that overcome or significantly reduce the following issues commonly associated with Mg—S cells: (a) impermeable passivating layer issue of Mg metal anode; (b) electrolyte incompatibility issue; (c) extremely low electric and ionic conductivities of sulfur, requiring large proportion (typically 30-55%) of non-active conductive fillers and having significant proportion of non-accessible or non-reachable sulfur or metal polysulfides); (d) dissolution of S and metal polysulfide in electrolyte and migration of polysulfides from the cathode to the anode, resulting in active material loss and capacity decay (the shuttle effect); and (e) short cycle life.

By addressing most of the aforementioned issues, the present invention provides a technically feasible rechargeable magnesium-sulfur battery that exhibits an exceptionally high specific energy (Wh/kg) or energy density (Wh/l) for a long cycle life. Thus, one particular technical goal of the present invention is to provide a magnesium-sulfur cell with a cell specific energy greater than 400 Wh/Kg, preferably greater than 600 Wh/Kg, and more preferably greater than 800 Wh/Kg (all based on the total cell weight).

Another object of the present invention is to provide a Mg—S cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of a cathode current collector, if present). The specific capacity is preferably higher than 1,400 mAh/g based on the sulfur weight alone or higher than 1,200 mAh/g based on the cathode composite weight. This must be accompanied by a high specific energy and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight). Unfortunately, a large proportion of non-active materials (such as conductive additive and binder that are not capable of storing metal ions) is typically used in their Li—S cells. For practical use purposes, it is more meaningful to use the cathode composite weight-based capacity value. The instant application makes use of total cathode composite material weight (excluding Al foil current collector, if present) as a basis for calculating the cathode specific capacity for our Mg—S cells.

SUMMARY OF THE INVENTION

The present invention provides a rechargeable magnesium-sulfur cell comprising an anode active material layer, an optional anode current collector, a porous separator and/or an electrolyte, a metal polysulfide-preloaded active cathode layer, and an optional cathode current collector, wherein the metal polysulfide-preloaded active cathode layer (also herein referred to as an active cathode layer or preloaded cathode layer) comprises:

- A) An integral porous structure of an electronically conductive material wherein the integral porous structure has massive surfaces having a specific surface area greater than 100 $m^2/g$ (Preferably >200 $m^2/g$, more preferably >300 $m^2/g$, further more preferably >500 $m^2/g$, still more preferably >700 $m^2/g$, and most preferably >1,000 $m^2/g$) or has pores with a size from 1.0 nm to 100 nm and wherein multiple particles, platelets or filaments of the conductive material form a 3-D network of electron-conducting paths (despite not using an additional conductive filler, such as carbon black, acetylene black, low surface area graphite flakes with a specific surface area <100 $m^2/g$); and
- B) a sulfur-rich metal polysulfide, $M_xS_y$, preloaded in these pores or deposited on these massive surfaces, wherein x is an integer from 1 to 3 and y is an integer from 1 to 10, and M is a metal element selected from an alkali metal, an alkaline metal (e.g. selected from Mg or Ca), a transition metal, a metal from groups 13 to 17 of the periodic table, or a combination thereof; wherein the metal polysulfide is in a form of solid-state thin coating or small particles with a thickness or diameter less than 100 nm and occupies a weight fraction of from 1% to 99% of the total weight of the porous structure and the metal polysulfide combined.

In certain embodiments, the metal element M is selected from Na, K, Mg, Ca, Zn, Cu, Ti, Ni, Co, Fe, Mn, Mo, Nb, Ta, Zr, or Al. In certain preferred embodiments, $M_xS_y$ is selected from $Li_2S$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S$, $K_2S_2$, $K_2S_3$, $K_2S_4$, $K_2S_5$, $K_2S_6$, $K_2S_7$, $K_2S_8$, $K_2S_9$, $K_2S_{10}$, $MgS$, $MgS_2$, $MgS_3$, $MgS_4$, or $Mo_6S_8$ (or $Mo_3S_4$).

In this active cathode layer, the metal polysulfide is in a solid-state form of thin coating or small particles with a thickness or diameter less than 100 nm (preferably <50 nm, more preferably <20 nm, further preferably <10 nm, still more preferably <5 nm, and most preferably <3 nm)) and occupies a weight fraction of from 1% to 99% (preferably at least 50%) of the total weight of the porous structure and the metal polysulfide combined. The weight fraction is preferably >70%, more preferably >80%, and most preferably >90%. Preferably, the $M_xS_y$ is loaded in these pores or deposited on these massive surfaces after (not before) the porous structure is made.

In an embodiment, the integral porous structure is a meso-porous structure formed of multiple particles, platelets, or filaments of a conductive material (i.e. carbon, graphite, metal, or conductive polymer), wherein the meso-porous structure has meso-scaled pores of 2-50 nm and a specific surface area greater than 100 $m^2/g$ and wherein the carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, activated meso-phase carbon, meso-porous carbon, electro-spun conductive nano fiber, highly separated vapor-grown carbon or graphite nano fiber, highly separated carbon nano-tube, carbon nanowire, metal nano wire, metal-coated nanowire or nano-fiber, conductive polymer-coated nanowire or nano-fiber, or a combination thereof, and wherein the particles or filaments are optionally bonded to form said porous structure by a binder of from 0% to 30% by weight of a total porous structure weight, not counting the metal polysulfide weight. It may be noted that un-treated carbon nano-tubes, non-separated CNTs, and un-treated carbon black, when packed together to form an electrode, may not have a specific surface area greater than 100 $m^2/m$.

In another embodiment, the integral porous structure is a porous graphene structure containing a graphene material or an exfoliated graphite material wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof and wherein the exfoliated graphite material is selected from exfoliated graphite worms, expanded graphite flakes, or recompressed graphite worms or flakes, and wherein said graphene structure comprises multiple sheets of said graphene material or multiple flakes of said exfoliated graphite material that are intersected or interconnected to form said integral layer with or without a binder to bond said multiple sheets or flakes together, wherein the binder is from a resin, a conductive polymer, coal tar pitch, petroleum pitch, meso-phase pitch, coke, or a derivative thereof and occupies from 0% to 30% by weight of a total porous graphene structure weight, not counting the metal polysulfide weight.

Prior to the battery fabrication, this preloaded cathode layer can be a free-standing layer (without being supported by a separate current collector) or is physically or chemically bonded to a current collector layer (such as a layer of Al foil).

In an embodiment, the preloaded cathode layer further comprises an element Z or compound $M_xZ_y$ deposited in these porous or on these massive surfaces wherein the element Z or $M_xZ_y$ is mixed with the metal polysulfide or formed as discrete coating or particles having a dimension less than 100 nm and Z element is selected from Sn, Sb, Bi, Se, and/or Te, and wherein x is an integer from 1 to 3, y is an integer from 1 to 10, and M is a metal element selected from an alkali metal, an alkaline metal, a transition metal, a metal from groups 13 to 17 of the periodic table, or a combination thereof, and the weight ratio of $Z/M_xS_y$ or $M_xZ_y/M_xS_y$ is less than 1.

In the preloaded cathode layer, the metal polysulfide occupies a weight fraction of at least 70% of the total weight of the porous structure and the metal polysulfide combined; preferably at least 80%, more preferably at least 90%, and most preferably at least 95%. Preferably, the metal polysulfide thickness or diameter is smaller than 10 nm, further preferably smaller than 5 nm, and most preferably smaller than 3 nm.

The electrolyte is preferably selected from polymer electrolyte, polymer gel electrolyte, composite electrolyte, ionic liquid electrolyte, non-aqueous liquid electrolyte, soft matter phase electrolyte, solid-state electrolyte, or a combination thereof.

Typically, a non-solid state electrolyte contains a magnesium salt dissolved in a solvent. Preferred salt/solvent combinations include $Mg(AlCl_2EtBu)_2/THF$, $Mg(ClO_4)_2/THF$, EMIC, $Mg(ClO_4)_2/PC$, and $Mg(ClO_4)_2/THF$, a recrystallized Mg complex $[Mg_2(\mu-Cl)_3(THF)_6][HMDS-AlCl_3]$, $(HMDS)_2Mg$/diglyme, $(HMDS)_2Mg$/tetraglyme, and (Mg $(BBu_2Ph_2)_2$/THF, wherein HMDS=hexamethyldisilazide, PC=propylene carbonate, Bu=butyl, Ph=phenyl, and THF=tetrahydrofuran. Preferably, the electrolyte is a non-nucleophilic electrolyte. Ionic liquid, such as bis(trifluoromethanesulfonyl) imide anion-based (TFSI $^-$based), may also be used. Solutions of organomagnesium halides, amidomagnesium halides, and magnesium organoborates in a variety of solvents (e.g. THF, or ethereal), and Grignard solutions (RMgX in ethers, R=organic alkyl or aryl group and X=halide like Cl or Br) may also be used. Useful solutions may be produced by reacting $AlCl_{(3-n)}R_n$ Lewis acid with $R_2Mg$ Lewis base in ethers (THF or glymes) at various ratios. All phenyl complex (APC) electrolyte solutions (e.g. in THF), comprising the products of the reaction between $PhxMgCl_{(2-x)}$ and $PhyAlCl_{(3-y)}$ (preferably PhMgCl and $AlCl_3$), are good electrolytes.

It may be noted that magnesium organohaloaluminate electrolytes, generated in situ from the reaction between a Lewis acid and a Lewis base, are nucleophilic and, in prior art teaching, would be considered un-suitable for use in a Mg—S cell. For example, a 2:1 mixture of phenylmagnesium chloride and aluminum trichloride ($AlCl_3$) in tetrahydrofuran (THF) would be incompatible with an electrophilic sulfur cathode. Quite unexpectedly, the implementation of the presently invented active cathode layer enables this class of electrolytes to work reasonably well in the Mg—S cells. This is a great accomplishment by itself.

It may be further noted that potassium hexamethyldisilazide ($KN(SiMe_3)_2$) is a non-nucleophilic base and, hence, hexamethyldisilazide magnesium chloride (HMDSMgCl) being capable of reversible Mg deposition, would be an excellent candidate electrolyte for the Mg—S cell. Unfortunately, the Coulombic efficiency, voltage stability and current density of the HMDSMgCl electrolyte are normally found to be far inferior to magnesium organohaloaluminate electrolytes, and, as a result, this electrolyte has not been accepted as a viable choice. Contrary to this belief, we have found that this electrolyte, when used in conjunction with the presently invented active cathode layer, does not have any significant issues on Coulombic efficiency, voltage stability and current density.

A special and highly advantageous feature of the inventive preloaded cathode layer is the notion that this class of metal sulfide species can be dissolved in a solvent to form a uniform solution. This solution readily permeates into the pores of the porous structure and the metal sulfide, when precipitated from the solution, can deposit uniformly in the form of a thin coating (preferably <20 nm in thickness) or ultra-fine particles (preferably <20 nm in diameter) in the pores or on the massive surfaces. This approach enables the deposition of a large amount of metal polysulfide relative to the porous structure material (hence, achieving a high proportion of cathode active material). This is quite surprising since pure sulfur could not be uniformly deposited into a porous structure using a solution deposition process to achieve both high sulfur amount and ultra-thin coating or small particles (<20 nm). This simple solution deposition process for metal polysulfide (not for sulfur) has another advantage in that it does not require a chemical reaction or electrochemical reaction (prior to battery fabrication), which otherwise can be more difficult to control, more tedious, and more expensive.

The thin coating or ultra-fine particles deposited thereon or therein provide ultra-short magnesium ion diffusion paths and, hence, ultra-fast reaction times for fast battery charges and discharges. This is achieved while, at the same time, achieving a relatively high proportion of sulfur (the active material responsible for storing magnesium) and, thus, high specific magnesium storage capacity of the resulting cathode active layer in terms of high mAh/g (based on the total weight of the cathode layer, including the masses of the active material, S, supporting substrate material, optional binder resin, and optional conductive filler combined). It is of significance to note that one might be able to use a prior art procedure to deposit small S or polysulfide particles, but cannot achieve a high S or metal polysulfide proportion at the same time, or to achieve a high proportion of S or polysulfide, but only in large particles or thick coating form. The prior art procedures have not been able to achieve both at the same time.

It is highly advantageous to achieve a high metal polysulfide loading (hence, high sulfur loading) and yet, concurrently, form an ultra-thin coating or ultra-small diameter particles of metal polysulfide (hence, sulfur) in terms of maximizing both the energy density and power density of a battery cell. This has not been possible with any prior art sulfur or polysulfide loading techniques. For instance, we have been able to deposit nano-scaled polysulfide particles or coating that occupy a >90% weight fraction of the cathode layer and yet maintain a coating thickness or particle diameter <3 nm. This is quite a feat in the art of any metal-sulfur batteries. In another example, we have achieved a >95% S loading at an average polysulfide coating thickness of 4.8-7 nm. These ultra-thin dimensions (3-7 nm) enable facile cathode reactions and nearly perfect sulfur utilization efficiency, something that no prior worker has been able to achieve.

The strategy of pre-loading metal polysulfide, instead of pure sulfur itself, in the cathode prior to the battery cell fabrication has a highly unexpected yet major advantage. We have surprisingly observed that such a strategy leads to a metal-sulfur battery with a longer cycle life. Not wishing to be limited by theory, but we think that this might be due to the notion that sulfur can undergo large-scale volume expansion when the battery is discharged. On repeated charges/discharges, the cathode structure can be easily damaged if an excessively high amount of sulfur is loaded into the cathode. If instead a metal polysulfide is preloaded, the volume changes only occur to a much smaller extent, effectively alleviating this cathode structure damage problem.

In addition to the magnesium salts recited earlier, the electrolyte can further contain an alkali metal salt (lithium salt, sodium salt, and/or potassium salt) selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), Lithium bis(oxalato)borate (LiBOB), lithium oxalyldifluoroborate ($LiBF_2C_2O_4$), lithium oxalyldifluoroborate (LiBF$_2$C$_2$O$_4$), Lithium nitrate (LiNO$_3$), Li-Fluoro-alkyl-Phosphates (LiPF$_3$(CF$_2$CF$_3$)$_3$), lithium bisperfluoro-ethysulfonylimide (LiBETI), an ionic liquid salt, sodium perchlorate (NaClO$_4$), potassium perchlorate (KClO$_4$), sodium hexafluorophosphate (NaPF$_6$), potassium hexafluo-rophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

As examples, the solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, tetrahydrofuran (THF), room temperature ionic liquid, or a combination thereof.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature. Common cations of RTILs include, but not limited to, Tetraalkylanunonium, Di-, Tri-, or Tetra-alkylimidazolium, Alkylpyridinium, Dialkylpyrrolidinium, Dialkylpiperidinium, Tetraalkylphosphonium, and Trialkylsulfonium. Common anions of RTILs include, but not limited to, BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2^-$, N(CN)$_2^-$, C(CN)$_3^-$, SCN$^-$, SeCN$^-$, AlCl$_4^-$, F(HF)$_{2.3}^-$, etc.

In an embodiment, the anode active material layer contains an anode active material selected from magnesium metal, magnesium alloy (>70% by weight Mg), or magnesium compound (>70% Mg) in a chip, foil, powder, disc, platelet, fibril form or practically any shape.

In the rechargeable magnesium-sulfur cell, the binder material (if desired) is selected from a resin, a conductive polymer, coal tar pitch, petroleum pitch, meso-phase pitch, coke, or a derivative thereof.

In the rechargeable magnesium-sulfur cell, the cathode may further comprise additional sulfur, sulfur-containing molecule, sulfur-containing compound, sulfur-carbon polymer, or a combination thereof, which is loaded before the cell is manufactured. The presently invented cell provides a reversible specific capacity of typically no less than 800 mAh per gram based on the total weight of the integral cathode layer (the weights of S, graphene material, optional binder, and optional conductive filler combined), not just based on the active material weight (sulfur) only. Most of the scientific papers and patent documents reported their sulfur cathode specific capacity data based on sulfur weight only.

More typically and preferably, the reversible specific capacity is no less than 1,000 mAh per gram and often exceeds 1,200 or even 1,500 mAh per gram of entire cathode layer. The high specific capacity of the presently invented cathode, when in combination with a magnesium anode, leads to a cell specific energy of no less than 600 Wh/Kg based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 700 Wh/Kg and, in some examples, exceeds 800 Wh/kg.

These and other advantages and features of the present invention will become more transparent with the description of the following best mode practice and illustrative examples.

DETAILED DESCRIPTION OF PREFERRED EMBODIMENTS

A. Magnesium Metal-Sulfur Cells

Figure 1A:
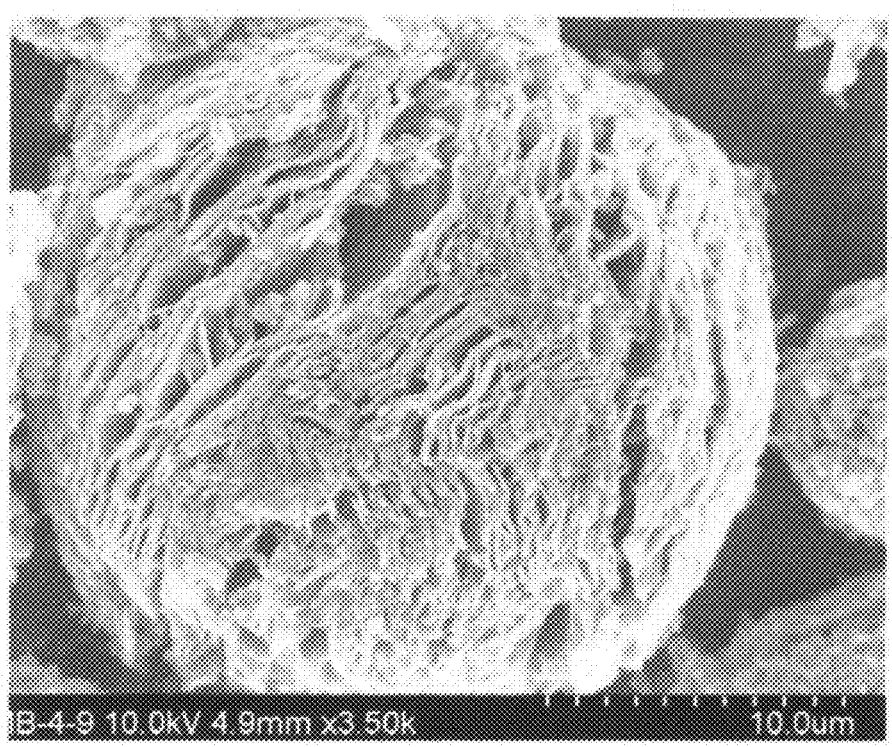
FIG. 1(A) SEM image of a meso-porous graphitic structure prepared by expanding a soft carbon.
Figure 1B:
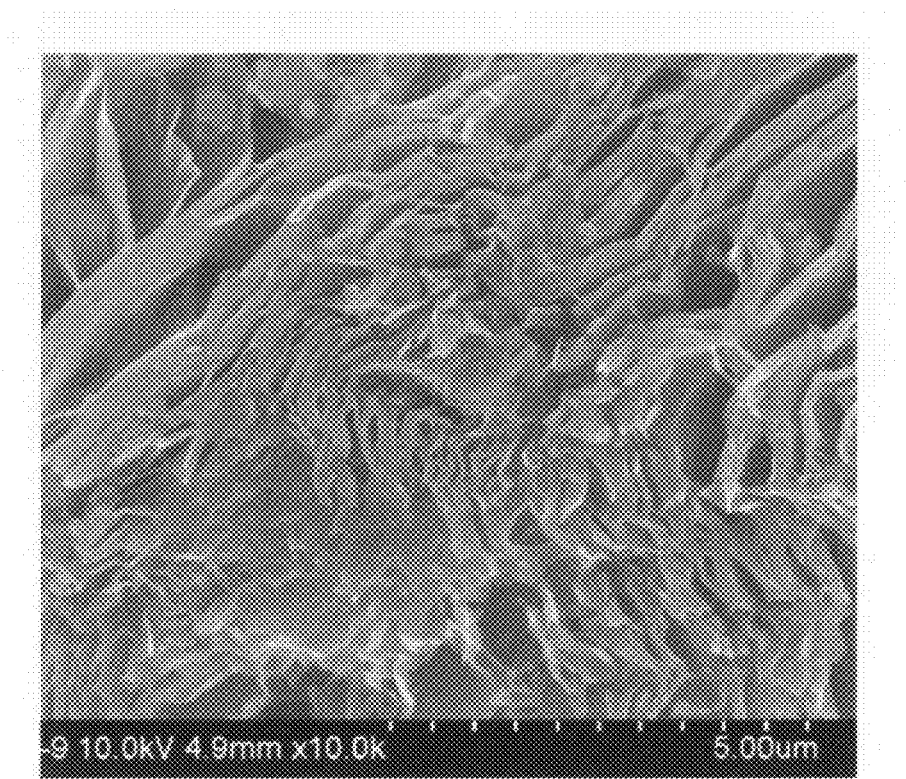
FIG. 1(B) a meso-porous graphitic structure prepared by chemically etching or expanding a hard carbon material.
Figure 1C:
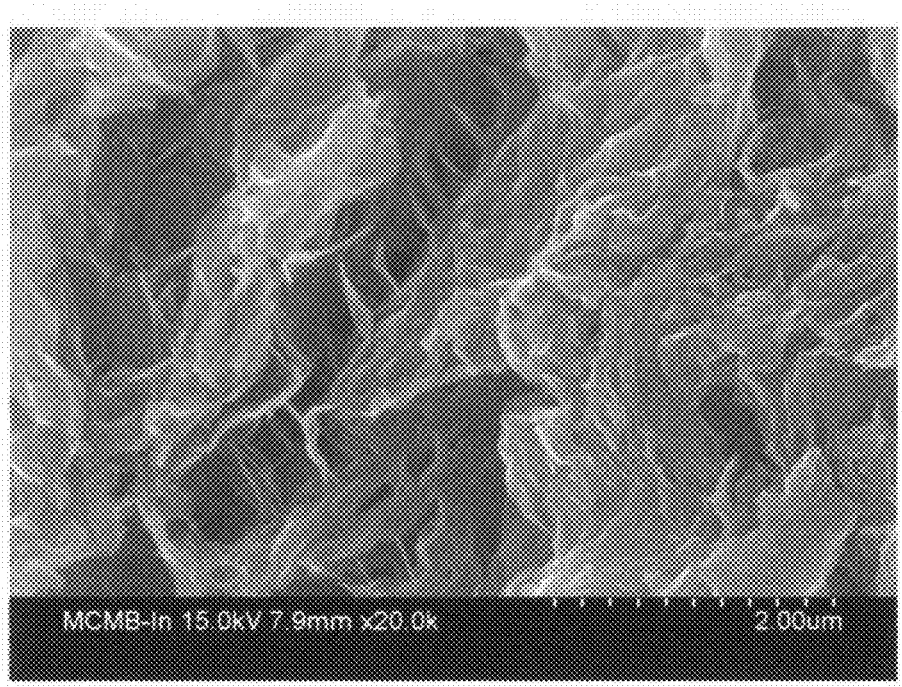
FIG. 1(C) an expanded MCMB.
Figure 1D:
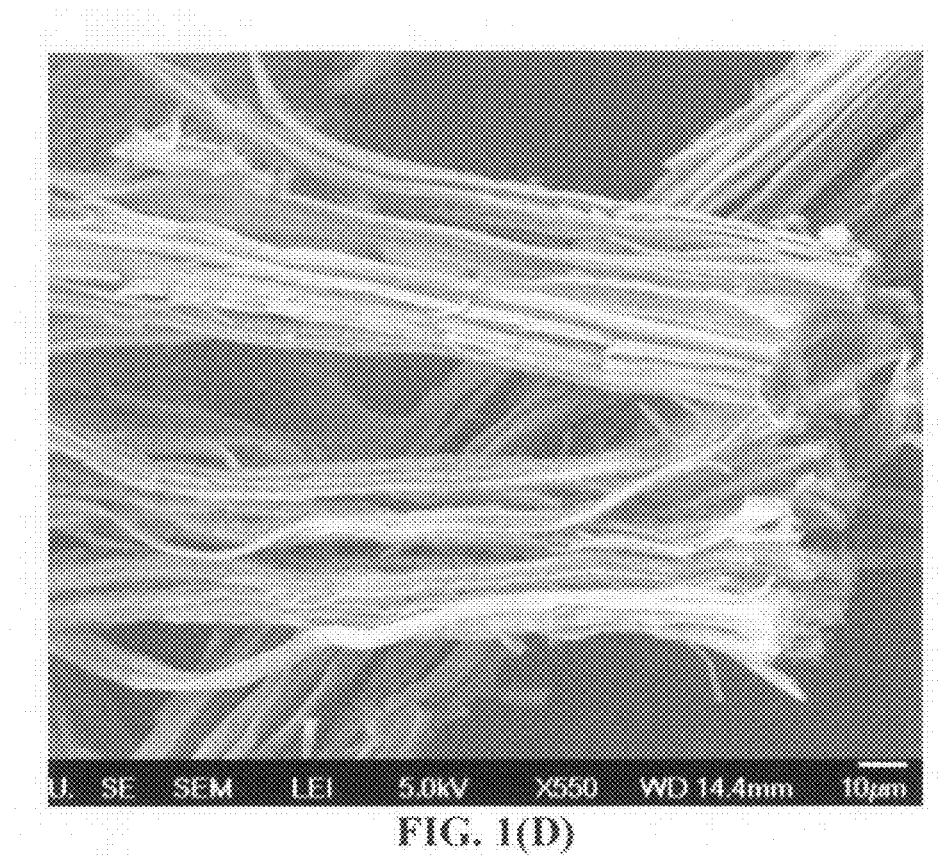
FIG. 1(D) expanded carbon fibers.
Figure 2:
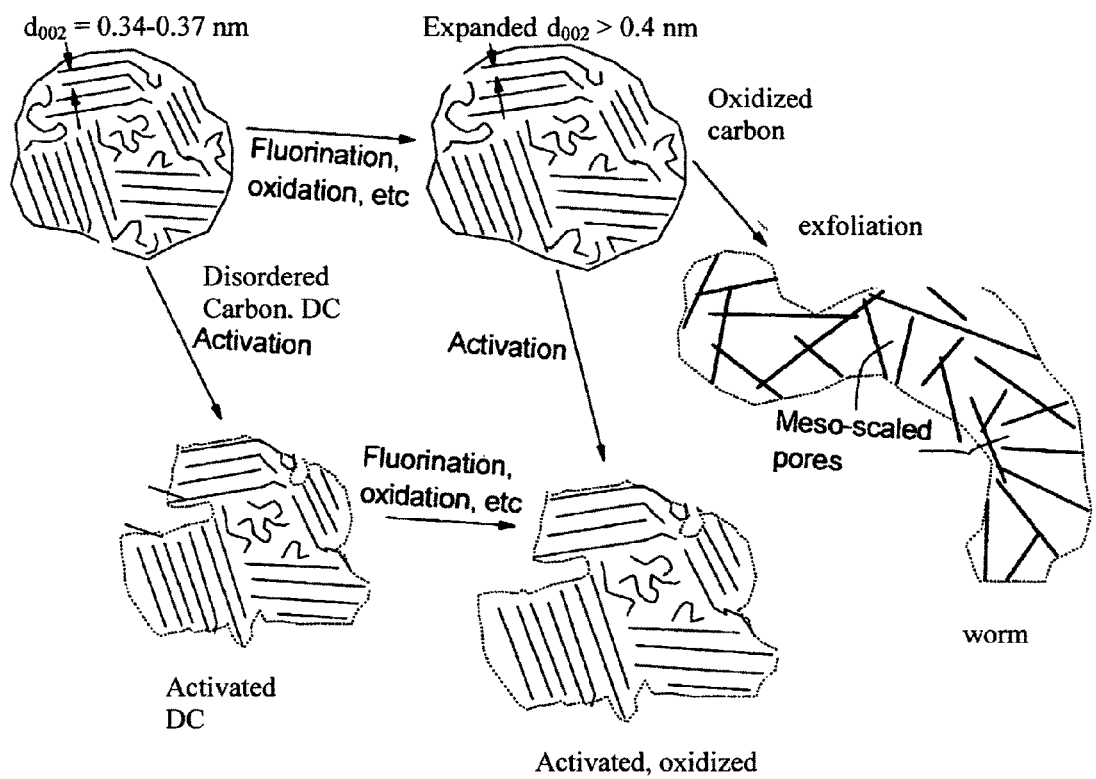
FIG. 2 Schematic of selected procedures for producing activated disordered carbon, oxidized or fluorinated carbon (with an expanded inter-graphene spacing), expanded carbon, and activated/expanded carbon from disordered carbon.
Figure 3:
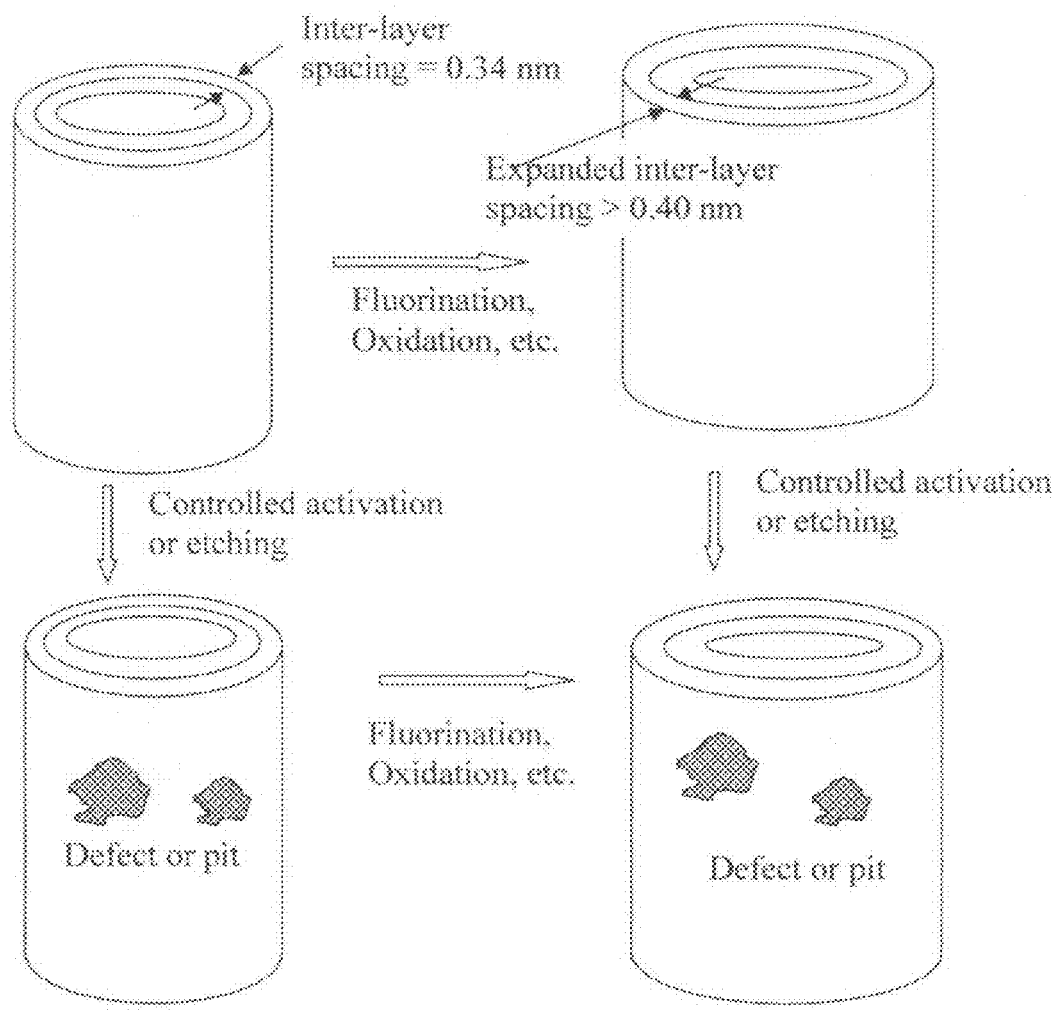
FIG. 3 Schematic of selected procedures for producing activated carbon nanotubes, oxidized or fluorinated CNTs with an expanded inter-graphene spacing, and activated/expanded CNTs from multi-walled CNTs.

The specific capacity and specific energy of a Mg—S cell are dictated by the actual amount of sulfur or metal polysulfide that can be implemented in the cathode active layer (relative to other non-active ingredients, such as the binder resin and conductive filler) and the utilization rate of this sulfur amount (i.e. the utilization efficiency of the cathode active material or the actual proportion of S or polysulfide that actively participates in storing and releasing magnesium ions). A high-capacity and high-energy Mg—S cell requires a high amount of S or metal polysulfide in the cathode active layer (i.e. relative to the amounts of non-active materials, such as the binder resin, conductive additive, and other modifying or supporting materials) and a high S utilization efficiency (little or no active material not accessible by the electrolyte and not reachable by electrons and metal ions during the charging/discharging operations). The present invention provides such a cathode active layer and a method of producing such a cathode active layer, which is preloaded with metal polysulfide (instead of S) prior to being incorporated in a Mg—S battery cell. This metal polysulfide, embedded in the cathode, can be readily converted into S during the first battery charging operation.

The present invention provides a rechargeable magnesium-sulfur cell featuring a very unique product—a metal sulfide-preloaded cathode layer (not a S-preloaded or presulfurized layer). This cathode active material-preloaded layer (also referred to as an active cathode layer or preloaded cathode layer) comprises:

A) An integral porous structure of an electronically conductive material wherein the porous structure has massive surfaces having a specific surface area greater than 100 m$^2$/g (preferably >300 m$^2$/g, more preferably >500 m$^2$/g, further preferably >750 m$^2$/g, and most preferably greater than 1,000 m$^2$/g) or has pores with a size from 1.0 nm to 100 nm (preferably from 2 nm to 50 nm) and wherein multiple particles, platelets or filaments of this conductive material form a 3-D network of electron-conducting paths, with or without the presence of a conductive filler (e.g. even without the commonly used conductive filler, such as carbon black particles or un-treated carbon nanotubes, for the mere purpose of improving electrode conductivity); and B) a sulfur-rich metal polysulfide, $M_xS_y$, preloaded in these pores or deposited on these massive surfaces, wherein x is an integer from 1 to 3 and y is an integer from 1 to 10, and M is a metal element selected from an alkali metal, an alkaline metal (e.g. selected from Mg or Ca), a transition metal, a metal from groups 13 to 17 of the periodic table, or a combination thereof;

In certain embodiments, the metal element M is selected from Li, Na, K, Mg, Ca, Zn, Cu, Ti, Ni, Co, Fe, Mn, Mo, Nb, Ta, Zr, or Al. In certain preferred embodiments, $M_xS_y$ is selected from from $Li_2S$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S$, $K_2S_2$, $K_2S_3$, $K_2S_4$, $K_2S_5$, $K_2S_6$, $K_2S_7$, $K_2S_8$, $K_2S_9$, $K_2S_{10}$, MgS, $MgS_2$, $MgS_3$, $MgS_4$, $MgS_5$, $MgS_6$, $Mo_6S_8$ (or $Mo_3S_4$), $Nb_6S_8$, $Zr_6S_8$, or $Ta_6S_8$, etc.

In this active cathode layer, the metal polysulfide is in a solid-state form of thin coating or small particles with a thickness or diameter less than 100 nm (preferably <50 nm, more preferably <20 nm, further more preferably <10 nm, and most preferably <5 nm) and occupies a weight fraction of from 1% to 99% (preferably at least 50%) of the total weight of the porous structure and the metal polysulfide combined. The weight fraction is preferably >70%, more preferably >80%, and most preferably >90%.

Preferably, the $M_xS_y$ is loaded in these pores or deposited on these massive surfaces after (not before) the integral porous structure is made. This is important since metal polysulfide is not electronically conductive and, hence, once the otherwise conductive particles/platelets/filaments are coated with metal polysulfide, the resulting coated particles/platelets/filaments are no longer conducting. These coated particles/platelets/filaments, when subsequently packed into a cathode layer, would not be electrically conductive due to electron-conducting paths being interrupted (e.g. conducting particle-to-particle contacts being replaced by non-conducting coating-to-coating contact). As a result, the electrochemical performance of Mg—S battery becomes unsatisfactory.

In one embodiment, the integral layer of a meso-porous structure is composed primarily of a carbon, graphite, metal, or conductive polymer selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, activated meso-phase carbon, meso-porous carbon, electro-spun conductive nano fiber, vapor-grown carbon or graphite nano fiber, carbon or graphite whisker, carbon nano-tube, carbon nanowire, metal nano wire, metal-coated nanowire or nano-fiber, conductive polymer-coated nanowire or nano-fiber, or a combination thereof. Particles and/or fibrils of this material, when packed into an integral electrode layer of meso-porous structure must still exhibit a specific surface area >100 m$^2$/g that this in direct contact with the electrolyte. The meso-pores must be accessible to the electrolyte.

In another embodiment, the layer of integral porous structure contains a graphene material or an exfoliated graphite material, wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, and wherein the exfoliated graphite material is selected from exfoliated graphite worms, expanded graphite flakes, or recompressed graphite worms or flakes (must still exhibit a high specific surface area, >>100 m$^2$/g, accessible to electrolyte). The graphene structure comprises multiple sheets of a graphene material that are intersected or interconnected to form the integral layer with or without a binder to bond the multiple sheets together and with or without a conductive filler being included in the integral porous layer.

The porous layer structure can contain, in addition to the $M_xS_y$ discussed above, 0-49% (preferably 0-30%, more preferably 0-20%, and further preferably 0-10%) by weight of sulfur or other sulfur-containing compound pre-loaded therein, based on the weights of all ingredients in the layer. Preferably, zero (0%) sulfur or sulfur-containing compound is pre-loaded into the porous structure since this pre-loaded material, if not done properly, can negatively impact the subsequent pre-loading step.

The metal polysulfide particles or coating have a thickness or diameter smaller than 20 nm (preferably <10 nm, more preferably <5 nm, and further preferably <3 nm) and wherein the nano-scaled particles or coating occupy a weight fraction of at least 70% (preferably >80%, more preferably >90%, and most preferably >95%) based on the total weights of the metal sulfide particles or coating and the porous material combined. It is advantageous to deposit as much metal polysulfide as possible yet still maintain ultra-thin thickness or diameter of coating or particles (e.g. >80% and <3 nm; >90% and <5 nm; and >95% and <10 nm, etc.).

B. Production of Various Integral Porous Structures

The following types of porous structures are found to be particularly suitable for use to support and protect the polysulfide coating or particles: a porous sheet, paper, web, film, fabric, non-woven, mat, aggregate, or foam of a graphene, carbon, or graphite material that has been expanded, activated, chemically treated, and, in the case of graphene, separated or isolated.

This porous structure can contain chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated or expanded carbon nano-tube, carbon fiber, graphite fiber, carbonized polymer fiber, coke, meso-phase carbon, or a combination thereof. The expanded spacing is preferably >0.5 nm, more preferably >0.6 nm, and most preferably >0.8 nm.

Alternatively, the porous structure may contain a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, graphitic foam, carbon aerogel, carbon xerox gel, or a combination thereof. These porous and electrically conductive materials are capable of accommodating sulfur in their pores and, in many cases, capable of protecting the sulfur coating or particles from getting dissolved in a liquid electrolyte, in addition to providing a 3-D network of electron-conducting paths. For the purpose of defining the claims, the instant cathode does not contain those isolated graphene sheets or platelets not supported on metal, carbon, ceramic, or polymer fibers or foams.

Further alternatively, such a porous sheet, paper, web, film, fabric, non-woven, mat, aggregate, or foam may be produced from multiple sheets of a graphene material selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. Details are later discussed in Section C below.

Conductive polymer nano-fiber mats can be readily produced by electro-spinning of a conductive polymer, which can be an intrinsically conductive (conjugate-chain) polymer or a conductive filler-filled polymer. Electro-spinning is well-known in the art. The production of carbon foam, carbon aerogel, or carbon Xerox gel is also well-known in the art.

Particularly useful metal foams include copper foam, stainless steel foam, nickel foam, titanium foam, and aluminum foam. The fabrication of metal foams is well known in the art and a wide variety of metal foams are commercially available. Preferably, the surfaces of metallic foams are coated with a thin layer of carbon or graphene because carbon and graphene are more electrochemically inert and will not get dissolved during the charge/discharge cycles of the cell. Hence, carbon-coated metal foam, graphene-coated metal foam, carbon-coated metal web or screen, graphene-coated metal web or screen, carbon-coated porous metal sheet, graphene-coated porous metal sheet, carbon-coated metal-fiber mat, graphene-coated metal-fiber mat, carbon-coated metal nanowire mat, and graphene-coated metal nano-wire mat are preferred current collector materials for use in the rechargeable lithium cell. Also particularly useful are carbon foam, carbon aerogel, and carbon xerox gel. These foams may be reinforced with a binder resin, conductive polymer, or CNTs to make a porous structure of good structural integrity.

In one preferred embodiment, highly porous graphitic or carbonaceous materials may be used to make a conductive and protective backbone porous structure prior to impregnating the resulting porous structure with metal polysulfide. In this approach, particles of these materials may be bonded by a binder to form a porous structure of good structural integrity.

In another possible route, porous graphitic or carbonaceous material particles, along with a resin binder, may be coated onto surfaces of a highly porous metal framework with large pores, such as a metal foam, web, or screen, which serves as a backbone for a meso-porous structure. The combined hybrid structure is preferably very porous with a specific surface area significantly greater than 100 $m^2/g$.

The carbonaceous or graphitic material may be selected from chemically treated graphite with an inter-graphene planar separation no less than 0.4 nm (preferably greater than 0.5 nm, more preferably greater than 0.6 nm) which is not exfoliated, soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon fiber or nano-fiber, or a combination thereof. These carbonaceous or graphitic materials have one thing in common; they all have meso-scaled pores, enabling entry of electrolyte to access their interior planes of hexagonal carbon atoms.

In one preferred embodiment, the meso-porous carbonaceous material may be produced by using the following recommended procedures:

(A) dispersing or immersing a graphitic or carbonaceous material (e.g., powder of meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a carbon intercalation compound (CIC), graphite fluoride (GF), or chemically etched/treated carbon material; and optionally (B) exposing the resulting CIC, GF, or chemically etched/treated carbon material to a thermal treatment, preferably in a temperature range of 150-600° C. for a short period of time (typically 15 to 60 seconds) to obtain expanded carbon.

Alternatively, after step (A) above, the resulting CIC, GF, or chemically etched/treated carbon material is subjected to repeated rinsing/washing to remove excess chemical. The rinsed products are then subjected to a drying procedure to remove water. The dried CIC, GF, chemically treated CB, chemically treated AC, chemically treated MWCNT, chemically treated CNF, chemically treated carbon/graphite/pitch fiber can be used as a cathode active material of the presently invented high-capacity cell. These chemically treated carbonaceous or graphitic materials can be further subjected to a heat treatment at a temperature preferably in the range of 150-600° C. for the purposes of creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by the electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc.). These materials per se (without chemical/thermal treatments as described above) are not good candidate cathode materials for the presently invented high-capacity Li-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

In general, the cathode active material (including the porous backbone structure and S lodged in the pores) as a whole also preferably form a meso-porous structure with a desired amount of meso-scaled pores (2-50 nm, preferably 2-10 nm) to allow the entry of electrolyte. This is advantageous because these pores enable a great amount of surface areas to be in physical contact with electrolyte and capable of capturing S precipitated from the electrolyte during the subsequent electrochemical deposition and capturing/releasing lithium (sodium or potassium) from/to the electrolyte during subsequent battery charges/discharges. These surface areas of the cathode active material as a whole are typically and preferably >100 $m^2/g$, more preferably >500 $m^2/g$, further more preferably >1,000 $m^2/g$, and most preferably >1,500 $m^2/g$.

C. Production of Various Graphene-Based Integral Porous Structures

In a preferred embodiment, the graphene electrode material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 4A:
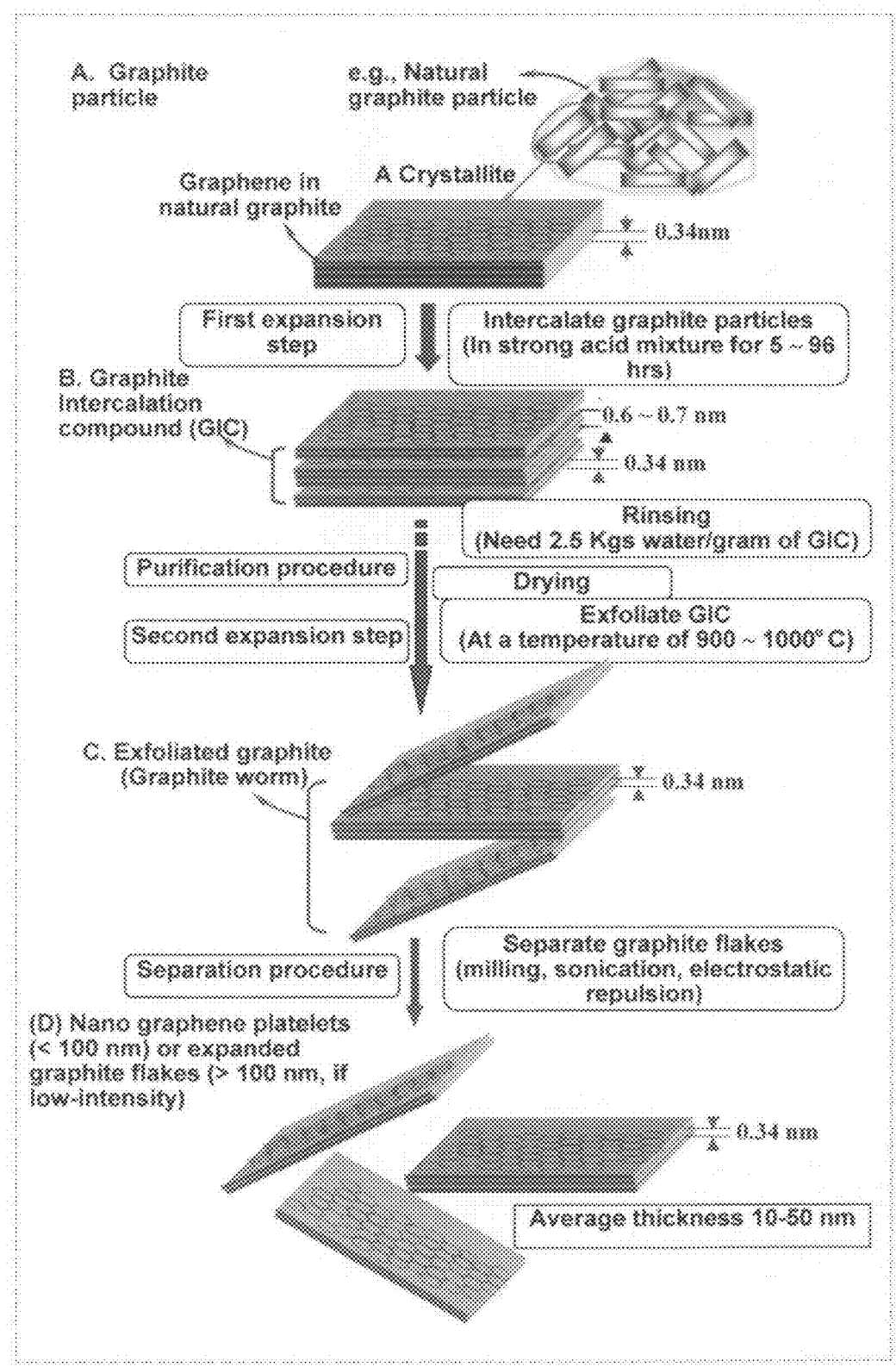
FIG. 4(A) Schematic of the commonly used procedures for producing exfoliated graphite worms and graphene sheets.
Figure 4:
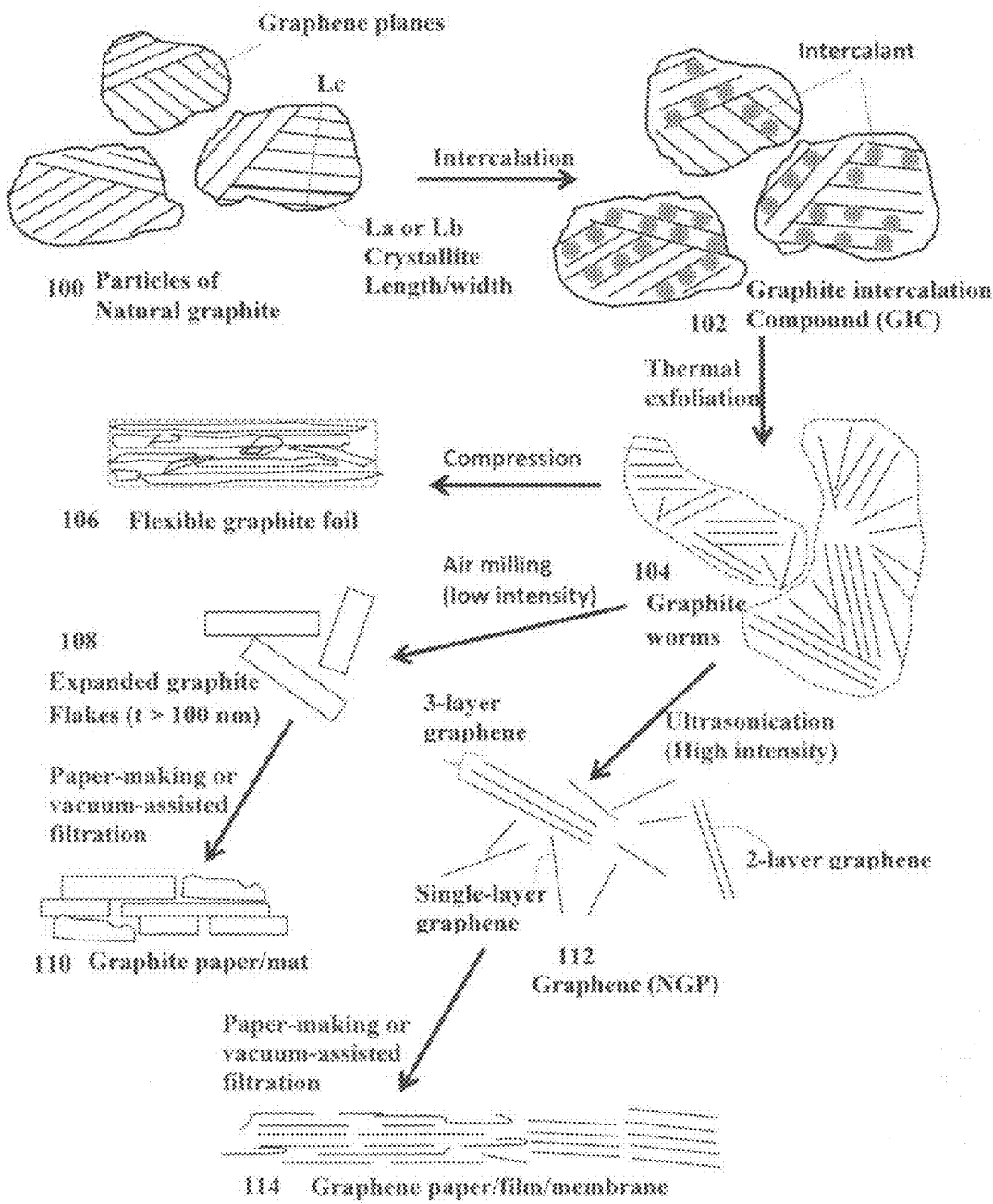
FIG. 4(B) Another schematic drawing to illustrate the process for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. 0, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 4(B), different crystallites in a graphite particle are typically oriented in different directions and, hence, a particular property of a multi-crystallite graphite particle is the directional average value of all the constituent crystallites.

Figure 5A:
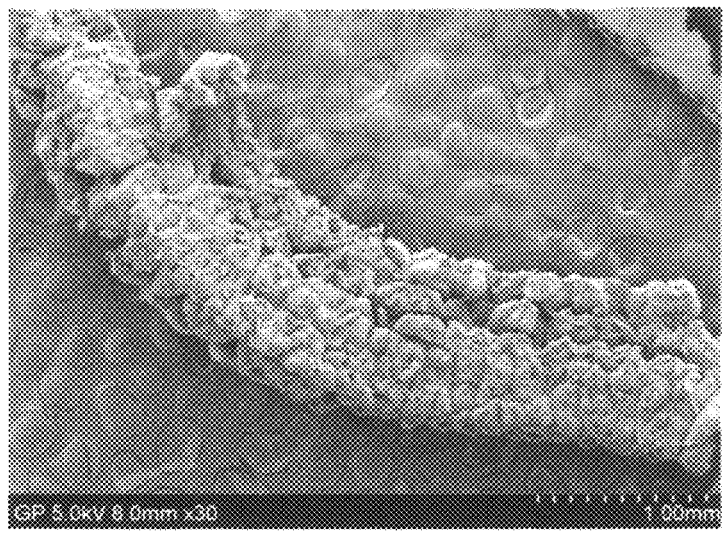
FIG. 5(A) SEM images of exfoliated graphite worms imaged at a low magnification.
Figure 5B:
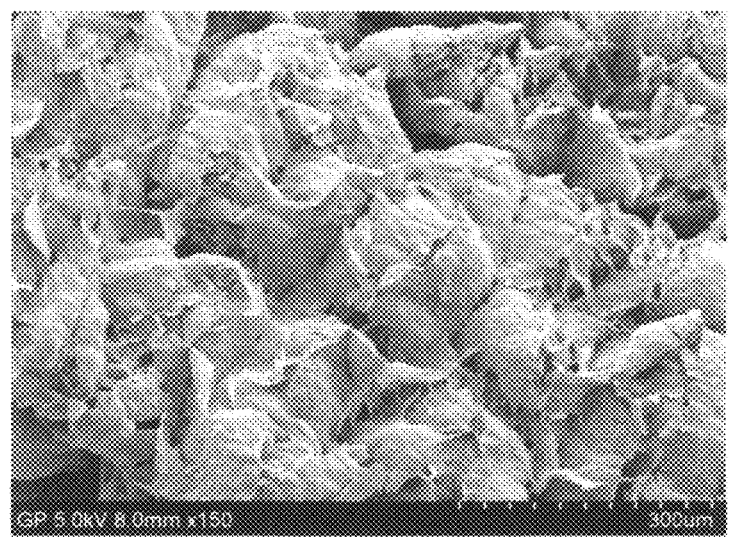
FIG. 5(B) same graphite worm as in 5(A), but taken at a higher magnification.
Figure 5C:
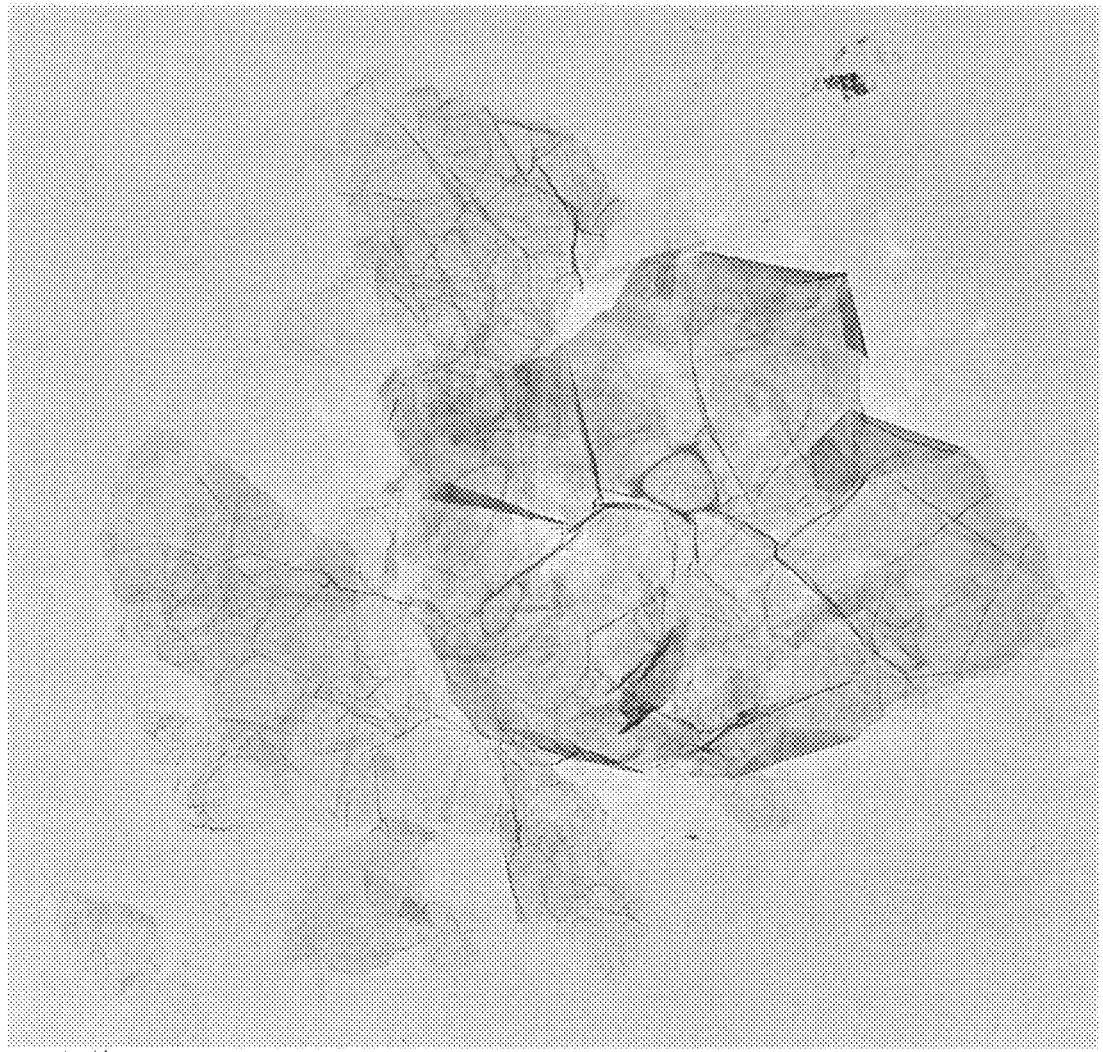
FIG. 5(C) TEM image of single-layer graphene sheets partially stacked together.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications. Examples of exfoliated graphite worms (or, simply, graphite worms) are presented in FIGS. 5(A) and 5(B).

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Several techniques can be employed to fabricate a conductive layer of porous graphene structure (a web, mat, paper, or porous film, etc.), which is a monolithic body having desired interconnected pores that are accessible to liquid electrolyte.

In one prior art process, the exfoliated graphite (or mass of graphite worms) is heavily re-compressed by using a calendaring or roll-pressing technique to obtain flexible graphite foils (106 in FIG. 4(B)), which are typically 100-500 µm thick. This conventional flexible graphite foil does not have a specific surface area >100 m$^2$/g. Even though the flexible graphite foil is porous, most of these pores are not accessible to liquid electrolyte when immersed in an external electrochemical deposition chamber or incorporated in a lithium battery. For the preparation of a desired layer of porous graphene structure, he compressive stress and/or the gap between rollers can be readily adjusted to obtain a desired layer of porous graphene structure that has massive graphene surfaces (having a specific surface area >100 m$^2$/g) accessible to liquid electrolyte and available for receiving the sulfur coating or nano particles deposited thereon.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process.

Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder. In one preferred embodiment of the present invention, the porous web can be made by using a slurry molding or a flake/binder spraying technique. These methods can be carried out in the following ways:

As a wet process, aqueous slurry is prepared which comprises a mixture of graphene sheets or expanded graphite flakes and, optionally, about 0.1 wt. % to about 10 wt. % resin powder binder (e.g., phenolic resin). The slurry is then directed to impinge upon a sieve or screen, allowing water to permeate through, leaving behind sheets/flakes and the binder. As a dry process, the directed sheet/flake spray-up process utilizes an air-assisted flake/binder spraying gun, which conveys flakes/sheets and an optional binder to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and an optional binder) remaining on the surface of the substrate being moved forward to go through a compaction stage by a pair of compaction rollers. Heat may be supplied to the mixture before, during, and after compaction to help cure the thermoset binder for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

D. Deposition of Metal Polysulfide on Massive Conductive Surfaces or in Pores of an Integral Porous Structure Once a layer of porous structure (e.g. a porous sheet, paper, web, film, fabric, non-woven, mat, aggregate, or foam having pores of 1-100 nm in size) is prepared, this layer can be impregnated with a desired amount of sulfur-rich metal polysulfide, $M_xS_y$, using several techniques:

The dip-coating technique is simple and effective and can be fully automated. In an embodiment, a proper amount of $M_xS_y$ is dissolved in a suitable solvent up to 0.1-10% by weight (typically <5%) to form a solution. A porous film (paper, web, fabric, foam, etc.) can be fed from a feeder roller and immersed into a bath containing such solution and emerged from this path, allowing the solvent to be removed before the impregnated porous film is wound on a winding roller. With a proper pore size range (preferably 2-50 nm) and surface chemical state of the conducting material (e.g. graphene surface, exfoliated graphite flake surface, etc.), species of $M_xS_y$ readily migrates into the pores and deposit, as a coating or nano particles, onto pore internal wall surfaces (or internal graphene domain surfaces), or simply precipitates out as nano $M_xS_y$ particles residing in the pores of the porous structure. This is a roll-to-roll or reel-to-reel process and is highly scalable. In other words, the active cathode layer can be mass produced cost-effectively.

The liquid dispensing and coating technique is also simple and effective, and can be automated as well. Again, a layer of porous structure can be fed from a feeder roller and collected on a winding roller. Between these two ends, a solution or suspension (containing $M_xS_y$ dissolved/dispersed in a liquid solvent) is dispensed and deposited on one or both surfaces of a porous structure. Heating and/or drying provisions are also installed to help remove the solvent, allowing the $M_xS_y$ species to permeate into the porous structure and precipitate out as a nano coating or nano particles. A broad array of dispensing/depositing techniques can be used; e.g. spraying (aerosol spraying, ultrasonic spraying, compressed air-driven spraying, etc.), printing (inkjet printing, screen printing, etc.), and coating (slot-die coating, roller coating, etc.). This is a highly scalable, roll-to-roll process.

The processing conditions can be readily adjusted to deposit $M_xS_y$ particles or coating that have a thickness or diameter smaller than 20 nm (preferably <10 nm, more preferably <5 nm, and further preferably <3 nm). The resulting nano-scaled metal polysulfide particles or coating occupy a weight fraction of from 1% to 99%, but preferably at least 50% (preferably >70%, further preferably 80%, more preferably >90%, and most preferably >95%) based on the total weights of the sulfur particles or coating and the graphene material combined.

A range of polysulfide, $M_xS_y$, can be selected, wherein x is an integer from 1 to 3 and y is an integer from 1 to 10, and M is a metal element selected from an alkali metal, an alkaline metal (preferably selected from Mg or Ca), a transition metal, a metal from groups 13 to 17 of the periodic table, or a combination thereof. It is essential that there is at least a solvent that can readily dissolve the polysulfide $M_xS_y$. It may be noted that this M does not have to be Mg even though this $M_xS_y$ is intended to be utilized as a precursor to the cathode active material of the Mg—S cell. We have surprisingly observed that the presence of a non-Mg metal element at the cathode can alter the chemical nature of electrolyte relative to sulfur in a favorable manner; i.e. making the electrolyte more compatible with the sulfur cathode. This is a highly desirable and unexpected feature. In this context, the metal element M is preferably selected from Li, Na, K, Ca, Zn, Cu, Ti, Ni, Co, Fe, Mn, Mo, Nb, Ta, Zr, or Al.

In certain preferred embodiments, $M_xS_y$ is selected from $Li_2S$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S$, $K_2S_2$, $K_2S_3$, $K_2S_4$, $K_2S_5$, $K_2S_6$, $K_2S_7$, $K_2S_8$, $K_2S_9$, $K_2S_{10}$, $MgS$, $MgS_2$, $MgS_3$, $MgS_4$, $MgS_5$, $MgS_6$, or $Mo_6S_8$ (or $Mo_3S_4$). Depending upon the intended type of $M_xS_y$ used, the solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. The $M_xS_y$ deposition is conducted before the cathode active layer is incorporated into an intended Mg—S cell.

After an extensive and in-depth research effort, we have come to realize that such a $M_xS_y$ pre-loading strategy surprisingly solves several most critical issues associated with current Mg—S cells. For instance, this method enables the metal sulfide to be deposited in a thin coating or ultra-fine particle form, thus, providing ultra-short diffusion paths for Mg ions and, hence, ultra-fast reaction times for fast battery charges and discharges. This is achieved while maintaining a relatively high proportion of metal sulfide, which is later converted into sulfur in the battery cell. Since sulfur is the active material responsible for storing Mg, this high loading of $M_xS_y$ implies a high specific Mg storage capacity of the resulting cathode active layer in terms of mAh/g, based on the total weight of the cathode layer, including the masses of the active material, supporting conductive material such as graphene sheets, optional binder resin, and optional conductive filler).

It is of significance to note that one might be able to use a prior art procedure to deposit small particles of S or select metal polysulfide, but not a high S or polysulfide proportion, or to achieve a high proportion but only in large particles or thick film form. But, the prior art procedures have not been able to achieve both high S or polysulfide proportion and ultra-thin coating/particles at the same time. It is highly advantageous to obtain a high metal polysulfide loading and yet, concurrently, maintaining an ultra-thin/small thickness/diameter of polysulfide for significantly enhanced energy density and power density. This has not been possible with any prior art sulfur loading techniques (not even for Li—S cells, let alone for Mg—S cells). For instance, we have been able to deposit nano-scaled metal polysulfide particles or coating that occupy a >90% weight fraction of the cathode layer and yet maintaining a coating thickness or particle diameter <3 nm. This is quite a feat in the art of Mg—S cells (in the art of lithium-sulfur batteries as well). As another example, we have achieved a >95% S loading at an average polysulfide coating thickness of 4.0-6 nm.

We have observed that the key to achieving a high active material utilization efficiency is minimizing the S or metal polysulfide coating or particle size and is independent of the amount of S or metal polysulfide loaded into the cathode provided the coating or particle thickness/diameter is small enough (e.g. <10 nm, or even better if <5 nm). The problem here is that it has not been previously possible to maintain a thin S or metal polysulfide coating or small particle size if S or metal polysulfide is higher than 50% by weight. Here we have further surprisingly observed that the key to enabling a high specific capacity at the cathode under high charge/discharge rate conditions is to maintain a high S or metal polysulfide loading and still keep the coating or particle size as small as possible, and this is accomplished by using the presently invented metal polysulfide pre-loading method.

The electrons coming from or going out through the external load or circuit must go through the conductive additives (in a conventional sulfur cathode) or a conductive framework (e.g. conductive meso-porous structure as herein disclosed) to reach the cathode active material. Since the cathode active material (e.g. sulfur or metal polysulfide) is a poor electronic conductor, the active material particle or coating must be as thin as possible to reduce the required electron travel distance.

Furthermore, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 879 mAh/g (<75% of S being utilized) and often less than 586 mAh/g (or <50% in this example) of what could be achieved. In other words, the active material (S) utilization rate is typically less than 75% (or even <50%). This has been a major issue in the art of Li—S cells (and in the field of Mg—S cells as well) and there has been no effective solution to this problem. Most surprisingly, the implementation of a porous structure as a conductive supporting material for metal polysulfide has made it possible to achieve an active material utilization rate of typically >>80%, more often greater than 90%, and, in many cases, close to 95%-99%.

Still another unexpected result of the instant invention is the observation that thinner polysulfide coating leads to more stable charge/discharge cycling with significantly reduced shuttling effect that has been a long-standing impediment to full commercialization of Li—S batteries. Mg—S cells also have the same shuttling effect issue. We overcome this problem yet, at the same time, achieving a high specific capacity. In all prior art Li—S cells, a higher S loading leads to a faster capacity decay. The shuttling effect is related to the tendency for sulfur or metal polysulfide that forms at the cathode to get dissolved in the solvent and for the dissolved polysulfide species to migrate from the cathode to the anode, where they irreversibly react with anode materials to form species that prevent sulfide from returning back to the cathode during the subsequent discharge operation of the cell (the detrimental shuttling effect). It seems that the presence of massive carbon or graphene surfaces have been able to prevent or reduce such a dissolution and migration issue.

Further significantly, we have unexpectedly discovered that a $M_xS_y$-preloaded cathode layer is more robust than a S-preloaded cathode layer in terms of maintaining the specific capacity of the cathode. This is likely due to the notion that a $M_xS_y$-preloaded cathode layer has already naturally built in some expanded volume and hence is less prone or more resistant to sulfur volume expansion-induced damage upon repeated charges/discharges.

In one embodiment (not preferably), the cathode layer may be pre-loaded with up to 30% (preferably <15% and more preferably <10%) of an active material (S or lithium polysulfide) prior to the active cathode layer fabrication. In yet another embodiment, the cathode layer can contain a conductive filler, such as carbon black (CB), acetylene black (AB), graphite particles, activated carbon, meso-porous carbon, meso-carbon micro bead (MCMB), carbon nano-tube (CNT), carbon nano-fiber (CNF), carbon fiber, or a combination thereof. These materials (not meso-porous) are merely for use as a conductive filler, not as a support for polysulfide.

E. Electrolyte and Anode

After this metal polysulfide-preloaded active cathode layer is made, this cathode layer (along with an optional cathode current collector) can be combined with an anode active material layer, an optional anode current collector, a porous separator and/or an electrolyte to form a Mg—S cell.

The anode active material layer may contain a layer of anode active material that contains at least 70% by weight Mg. This can include Mg metal (>99.9% Mg) or a Mg alloy or compound that contains from 70% to 99.9% Mg. This active material can be in any shape, but preferably in the form of a sheet/film of Mg or Mg alloy, or in a form of multiple fine particles, discs, platelets, chips, or filaments that are packed together to form a layer. This active material may be supported by massive surfaces of a conductive material having a high specific surface area (e.g. >100 m$^2$/g).

The electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof. Ionic liquid, such as bis(trifluoromethanesulfonyl) imide anion-based (TFSI $^-$based), may also be used.

Typically, a non-solid state electrolyte contains a magnesium salt dissolved in a solvent. Preferred salt/solvent combinations include $Mg(AlCl_2EtBu)_2$/THF, $Mg(ClO_4)_2$/THF, EMIC, $Mg(ClO_4)_2$/PC, and $Mg(ClO_4)_2$/THF, a recrystallized Mg complex $[Mg_2(\mu\text{-}Cl)_3(THF)_6][HMDS\text{-}AlCl_3]$, $(HMDS)_2Mg$/diglyme, $(HMDS)_2Mg$/tetraglyme, and (Mg $(BBu_2Ph_2)_2$/THF, wherein HMDS=hexamethyldisilazide, PC=propylene carbonate, Bu=butyl, Ph=phenyl, and THF=tetrahydrofuran. Preferably, the electrolyte is a non-nucleophilic electrolyte.

Solutions of organomagnesium halides, amidomagnesium halides, and magnesium organoborates in a variety of solvents (e.g. THF, or ethereal), and Grignard solutions (RMgX in ethers, R=organic alkyl or aryl group and X=halide like Cl or Br) may also be used. Useful solutions may be produced by reacting $AlCl_{(3-n)}R_n$ Lewis acid with $R_2Mg$ Lewis base in ethers (THF or glymes) at various ratios. All phenyl complex (APC) electrolyte solutions (e.g. in THF), comprising the products of the reaction between $PhxMgCl_{(2-x)}$ and $PhyAlCl_{(3-y)}$ (preferably PhMgCl and $AlCl_3$), are good electrolytes.

Magnesium organohaloaluminate electrolytes, produced in situ from the reaction between a Lewis acid and a Lewis base, are nucleophilic and, in prior art teaching, would be considered un-suitable for use in a Mg—S cell. For example, a 2:1 mixture of phenylmagnesium chloride and aluminum trichloride ($AlCl_3$) in tetrahydrofuran (THF) would be incompatible with an electrophilic sulfur cathode. Quite unexpectedly, the implementation of the presently invented active cathode layer enables this class of electrolytes to work reasonably well in the Mg—S cells. Not wishing to be bound by theory, but it seems that the present strategy somehow is effective in preventing this class of electrolytes from directly reacting with sulfur to form phenyl disulfide and biphenyl sulfide.

It may be noted that potassium hexamethyldisilazide ($KN(SiMe_3)_2$) is a non-nucleophilic base and, hence, hexamethyldisilazide magnesium chloride (HMDSMgCl) being capable of reversible Mg deposition, would be an excellent candidate electrolyte for the Mg—S cell. Unfortunately, the Coulombic efficiency, voltage stability and current density of the HMDSMgCl electrolyte are normally found to be far inferior to magnesium organohaloaluminate electrolytes, and, as a result, this electrolyte has not been accepted as a viable choice. Quite unexpectedly, we have found that this electrolyte, when used in conjunction with the presently invented active cathode layer, does not have any significant issues on Coulombic efficiency, voltage stability and current density.

A certain amount of Li-, Na- or other metal salts can be added into these electrolytes designed presumably for Mg—S cells. This second salt, as a modifier, should preferably less than 50% by weight of the total salt weight; more preferably less than 30% and most preferably less than 10%. This second or modifying salt may be may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [LiN $(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN $(CF_3SO_2)_2$), sodium trifluoromethanesulfonimide (NaTFSI), or bis-trifluoromethyl sulfonylimide potassium ($KN(CF_3SO_2)_2$). The electrolyte may contain an ionic liquid.

A well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

The following examples are presented primarily for the purpose of illustrating the best mode practice of the present invention and should not be construed as limiting the scope of the present invention.

Example 1

Meso-porous Soft Carbon as a Supporting and Protective Backbone for Metal Polysulfide Chemically etched or expanded soft carbon was prepared from heat-treating a liquid crystalline aromatic resin (50/50 mixture of anthracene and pyrene) at 200° C. for 1 hour. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. This material can be used in both the anode and cathode due to its high specific surface area and its ability to capture and store Mg atoms on its surfaces. These surfaces (inside pores) were also found to be particularly suitable for supporting metal polysulfide nano coating or nano particles.

Example 2

Expanded "Activated Carbon" (E-AC) as a Supporting and Protective Porous Backbone for Metal Polysulfide Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC.

This material can be used in both the anode and cathode of a Mg cell due to its high specific surface area and ability to capture and store Mg and/or S atoms on its surfaces. These surfaces were also found to be particularly suitable for supporting nano metal polysulfide in meso-pores.

Example 3

Chemically Treated (Expanded) Needle Coke as a Supporting and Protective Porous Backbone for Metal Polysulfide Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours. The treated coke is highly porous, having a pore size range of approximately 1-85 nm and being suitable for entry of metal polysulfide solution and deposition of metal polysulfide.

Example 4

Chemically Treated (Expanded) Petroleum Pitch-Derived Hard Carbon as a Supporting and Protective Porous Backbone A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles. The hard carbon-based porous structure was found to have a pore size range of 3-100 nm (mostly <50 nm) and to be particularly suitable for supporting and protecting metal polysulfide lodged therein.

Example 5

Chemically Activated Meso-phase Carbon and Production of Fluorinated Carbon as a Supporting and Protective Porous Backbone Meso-carbon carbon particles (un-graphitized MCMBs) were supplied from China Steel Chemical Co. This material has a density of about 2.2 g/cm$^3$ with a median particle size of about 16 µm. This batch of meso-phase carbon was divided into two samples. One sample was immersed in $K_2CO_3$ at 900° C. for 1 h to form chemically activated meso-carbon. The chemically activated meso-phase carbons showed a BET specific surface area of 1,420 m$^2$/g. This material can be used in both the anode and cathode due to its high specific surface area and ability to capture and store metal atoms on its surfaces. These surfaces were found to be suitable for supporting and protecting metal polysulfide nano coating or particles as well.

Example 6

Graphitic Fibrils from Pitch-based Carbon Fibers for Forming a Porous Backbone

Fifty grams of pitch-based graphite fibers were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured. Graphitic fibrils, alone or in combination with another particulate carbon/graphite material, can be packed into a meso-porous structure (mat or paper) for supporting metal polysulfide.

Example 7

Expanded Multi-walled Carbon Nanotubes (MWCNTs) as a Supporting and Protective Porous Backbone Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. Expanded MWCNTs, alone or in combination with another particulate carbon/graphite material, can be packed into a meso-porous structure for supporting metal polysulfide.

Example 8

Preparation of Graphene Oxide (GO) and Reduced GO Nano Sheets from Natural Graphite Powder and their Paper/Mats (Layers of Porous Graphene Structure)

Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt %

$H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. These suspensions (GO in water and RGO in surfactant water) were then filtered through a vacuum-assisted membrane filtration apparatus to obtain GO and RGO paper or mat. These porous paper/mat structures can be used to accommodate metal polysulfide to form a cathode layer.

Example 9

Preparation of Discrete Functionalized GO Sheets from Graphite Fibers and Porous Films of Chemically Functionalized GO Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a pot of slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and the suspensions were allowed to stay in the container without any mechanical disturbance for 2 days, forming liquid crystalline phase in the water-alcohol liquid when alcohol is being vaporized at 80° C.

The resulting suspensions containing GO or f-GO liquid crystals were then cast onto a glass surface using a doctor's blade to exert shear stresses, inducing GO sheet orientations. The resulting GO or f-GO coating films, after removal of liquid, have a thickness that can be varied from approximately 10 to 500 μm. The resulting GO film was then subjected to heat treatments that involve an initial thermal reduction temperature of 80-350° C. for 8 hours, followed by heat-treating at a second temperature of 1,500-2,850° C. for different specimens to obtain various porous graphitic films. These porous films can be used to accommodate metal polysulfide to form a cathode layer.

Example 10

Preparation of Single-Layer Graphene Sheets and Porous Graphene Mats from Meso-Carbon Micro-Beads (MCMBs)

Meso-carbon micro-beads (MCMBs) were supplied from China Steel Chemical Co., Kaohsiung, Taiwan. This material has a density of about 2.24 $g/cm^3$ with a median particle size of about 16 μm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The suspension was then diluted to approximately 0.5% by weight in a container and was allowed to age therein without mechanical disturbance. The suspension was then slightly heated (to 65° C.) to vaporize the water under a vacuum-pumping condition. The formation of liquid crystalline phase became more apparent as water was removed and the GO concentration was increased. The final concentration in this sample was set at 4% by weight. The dispersion containing liquid crystals of GO sheets was then cast onto a glass surface using a doctor's blade to exert shear stresses, inducing GO sheet orientations. The resulting GO films, after removal of liquid, have a thickness that can be varied from approximately 10 to 500 μm. The resulting GO compact was then subjected to heat treatments to produce porous structures. These treatments typically involve an initial thermal reduction temperature of 80-500° C. for 1-5 hours, followed by heat-treating at a second temperature of 1,500-2,850° C. These porous films can be used to accommodate metal polysulfide to form a cathode layer.

Example 11

Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGF having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. The suspension was then filtered via vacuum-assisted filtration to obtain porous graphene paper structures. These porous structures can be used to accommodate metal polysulfide to form a cathode layer. All porous structures can also be used to support Mg metal or alloy in the anode.

Example 12

Preparation of Graphene Fluoride Nano Sheets and Porous Graphene Structure from these Sheets Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets. These graphene fluoride sheets were then added into a polymer-solvent or monomer-solvent solution to form a suspension. Various polymers or monomers (or oligomers) were utilized as the precursor film materials for subsequent carbonization and graphitization treatments.

Upon casting on a glass surface with the solvent removed, the dispersion became a brownish film formed on the glass surface. When these GF-reinforced polymer films were heat-treated, fluorine and other non-carbon elements were released as gases that generated pores in the film. The resulting porous graphitic films had physical densities from 0.33 to 1.22 g/cm³. These porous graphitic films were then roll-pressed to obtain graphitic films (porous graphene structures) having a density from 0.8 to 1.5 g/cm³. These porous films can be used to accommodate metal polysulfide to form a cathode layer.

Example 13

Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 Wt % respectively as found by elemental analysis. These nitrogenataed graphene sheets remain dispersible in water. Two types of dispersions were then prepared. One involved adding water-soluble polymer (e.g. polyethylene oxide) into the nitrogenated graphene sheet-water dispersion to produce a water-based suspension. The other involved drying the nitrogenated graphene sheet-water dispersion to recover nitrogenated graphene sheets, which were then added into precursor polymer-solvent solutions to obtain organic solvent-based suspensions.

The resulting suspensions were then cast, dried, carbonized and graphitized to produce porous graphene structures. The carbonization temperatures for comparative samples are 900-1,350° C. The graphitization temperatures are from 2,200° C. to 2,950° C. These porous structures can be used to accommodate metal polysulfide to form a cathode layer.

Example 14

Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. Some of the graphite forms were then roll-pressed to obtain samples of re-compressed exfoliated graphite having a range of physical densities (e.g. 0.3 to 1.2 g/cm$^3$). Some of the graphite worms were subjected to low-intensity sonication to produce expanded graphite flakes. These expanded graphite flakes were then made into a porous paper form using the vacuum-assisted filtration technique. These porous structures can be used to accommodate metal polysulfide to form a cathode layer.

Example 15

Exfoliated Graphite Worms from Various Synthetic Graphite Particles or Fibers

Additional exfoliated graphite worms were prepared according to the same procedure described in Example 1, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some amount of the graphite forms was then roll-pressed to obtain samples of re-compressed exfoliated graphite having a range of physical densities (e.g. 0.3 to 1.2 g/cm$^3$). A second amount of the graphite worms was subjected to low-intensity sonication to produce expanded graphite flakes. These expanded graphite flakes were then made into a paper form (the porous structure) using the vacuum-assisted filtration technique. These porous structures can be used to accommodate metal polysulfide to form a cathode layer.

Example 16

Exfoliated Graphite Worms from Natural Graphite Using Hummers Method

Additional graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798, 878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Some of the graphite forms were then roll-pressed to obtain samples of re-compressed exfoliated graphite having a range of physical densities (e.g. 0.3 to 1.2 g/cm$^3$). Some of the graphite worms were subjected to low-intensity sonication to produce expanded graphite flakes. These expanded graphite flakes were then made into a porous paper form using the vacuum-assisted filtration technique. These porous structures can be used to accommodate metal polysulfide to form a cathode layer. All porous structures can also be used to support Mg metal or alloy in the anode Example 17

Conductive Web of Filaments from Electro-spun PAA Fibrils as a Supporting Layer for Both an Anode and a Cathode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nano-fibers with an average fibril diameter of 67 nm. Such a web can be used as a conductive substrate for an anode active material. We observe that the implementation of a network of conductive nano-filaments at the anode of a Li—S cell can effectively suppress the initiation and growth of lithium dendrites that otherwise could lead to internal shorting. Carbonized version of PI nano-fibers can be formed into a meso-porous mat for supporting metal polysulfide in the cathode, or Mg metal in the anode.

Example 18

Deposition of Metal Polysulfide in Various Meso-Porous Webs or Paper Structures Prepared in Previous Examples for Mg—S Batteries The deposition of metal polysulfide was conducted before the cathode active layer was incorporated into a Mg—S battery cell. In a typical procedure, a metal polysulfide $(M_xS_y)$ is dissolved in a solvent (e.g. mixture of DOL/DME in a volume ratio from 1:3 to 3:1) to form an electrolyte solution. Several types of metal polysulfide materials are commercially available. A wide variety of solvents can be utilized for this purpose and there is no theoretical limit to what type of solvents can be used; any solvent can be used provided that there is some solubility of the metal polysulfide in this desired solvent. A greater solubility would mean a larger amount of polysulfide can be precipitated out from the electrolyte solution and deposited in the porous structure.

Those commercially unavailable metal polysulfide materials can be readily prepared in a lab setting. As a series of examples, lithium polysulfide $(Li_xS_y)$ and sodium polysulfide $(Na_xS_y)$ with desired x and y values (e.g. x=2, and y=6-10) dissolved in solvent were prepared by chemically reacting stoichiometric amounts of sulfur and $Li_2S$ or $Na_2S$ in polysulfide free electrolyte of 0.5 M LiTFSI+0.2 M LiNO$_3$ (or 0.5 M NaTFSI+0.2 M NaNO$_3$) in DOL/DME (1:1, v:v). The electrolyte was stirred at 75° C. for 3-7 hours and then at room temperature for 48 hours. The resulting electrolytes contain different $Li_xS_y$, or $Na_xS_y$, species (e.g. x=2, and y=6-10, depending upon reaction times and temperatures), which are intended for use as a sulfur source in a Mg—S battery cell.

Several methods were utilized to introduce polysulfide-solvent solution into the pores of the conductive porous structure. One method entailed drawing a desired amount of solution into a syringe, which was then discharged and dispensed onto the porous structure. In most cases, the solution naturally permeates into the pores. Another method involved using a lab-scale liquid sprayer to spray the solution over the porous structure. Yet another method included dipping the entire porous structure into the solution for a desired period of time. In all methods, precipitation of metal polysulfide occurred upon removal of the solvent. This drying procedure allows the precipitated polysulfide to deposit onto the internal walls of the pores in a thin coating form, or to form nano particles that simply lodge in the pores of the porous structure.

Some examples of the metal polysulfide ($M_xS_y$) materials, solvents, porous structure materials used in the present study are presented in Table 1 below, wherein the following abbreviations are used: chemically etched or expanded soft carbon (CSC), chemically etched or expanded hard carbon (CHC), exfoliated activated carbon (EAC), chemically etched or expanded carbon black (CCB), chemically etched multi-walled carbon nanotube (C-CNT), nitrogen-doped carbon nanotube (N-CNT), boron-doped carbon nanotube (B-CNT), chemically doped carbon nanotube (D-CNT), ion-implanted carbon nanotube (I-CNT), chemically treated carbon fiber (CCF), chemically activated graphite fiber (CGF), chemically activated carbonized polymer fiber (CC-PF), chemically treated coke (C-coke), activated meso-phase carbon (A-MC), meso-porous carbon (MC), electro-spun conductive nano fiber (ES-NF), vapor-grown carbon or graphite nano fiber (VG-CNF or VG-GNF), metal nano wire (M-NW), metal-coated nanowire or nano-fiber (MC-NW), conductive polymer-coated nanowire or nano-fiber (CP-NW or CP-NF).

In a Mg—S cell, a proper electrolyte was selected to combine with an anode current collector (Cu foil), an anode layer (e.g. Mg metal foil), a porous separator, a layer of conductive porous structure, and a cathode current collector (Al foil) to form a Mg—S cell. The cell was then subjected to a first discharge or charge procedure using a current density preferably ranging from 50 mA/g to 5 A/g.

For comparison purposes, several prior art methods were used to incorporate sulfur (the cathode active material) in the cathode layer; e.g. direct mixing of S powder with carbon black particles, physical vapor deposition of S in a carbon paper (e.g. carbon nano-fiber, CNF), direct mixing lithium polysulfide particles with a conductive filler (e.g. carbon nanotubes), etc.

Comparative Example 18A

Chemical Reaction-Induced Deposition of Sulfur Particles on Chemically Treated or Un-Treated CNTs A prior art chemical deposition method is herein utilized to prepare S-CNT composites. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a CNT-sulfur composite was prepared by a chemical deposition method in an aqueous solution. First, 180 mg of CNTs was suspended in 180 ml ultrapure water with a surfactant and then sonicated at 50° C. for 5 hours to form a stable CNT dispersion. Subsequently, the $Na_2S_x$ solution was added to the above-prepared GO dispersions in the presence of 5 wt % surfactant cetyl trimethyl-ammonium bromide (CTAB), the as-prepared CNT/$Na_2S_x$ blended solution was sonicated for another 2 hours and then titrated into 100 ml of 2 mol/L HCOOH solution at a rate of 30-40

TABLE 1

Selected examples of the metal polysulfide materials, solvents, and porous conductive structures used in the present study.

| $M_xS_y$ | Solvent | Type of porous structure in the cathode |
| --- | --- | --- |
| $Li_2S_6$ | DOL/DME | CSC, CHC, EAC, CCB, RGO, GO, pristine graphene |
| $Li_2S_9$ | DOL/DME | CSC, CHC, EAC, CCB, Nitrogenated graphene, B-doped graphene, Ni foam |
| $Li_2S_{10}$ | DOL/DME | Exfoliated graphite, RGO, EAC, amine-functionalized graphene, ES-NF, A-MC |
| $Na_2S_2$ | Tetra ethylene glycol dimethyl ether (TEGDME) | C-CNT, N-CNT, B-CNT, D-CNT, I-CNT, C-coke |
| $Na_2S_4$ | TEGDME | RGO, B-doped graphene, Ni foam, graphene-coated Cu foam |
| $Na_2S_6$ | TEGDME | C-CNT, CCF, CGF, CC-PF |
| $K_2S_6$ | TEGDME | C-coke, A-MC, MC, ES-NF, VG-CNF, VG-GNF |
| $K_2S_4$ | Diglyme/tetraglyme | M-NW, MC-NW, CP-NW, CP-NF |
| $K_2S$ | Diglyme/tetraglyme | CSC, CHC, EAC, CCB |
| $MgS_6$ | Diglyme/tetraglyme | M-NW, MC-NW, CP-NW, CP-NF |
| $MgS_4$ | Diglyme/tetraglyme | CSC, CHC, EAC, CCB |
| $CuS_2$ | $NH_4OH$ or HCl or $H_2SO_4$ | C-CNT, N-CNT, B-CNT, D-CNT, I-CNT |
| $Cu_8S_5$ | $NH_4OH$ or HCl or $H_2SO_4$ | CSC, CHC, EAC, CCB |
| ZnS | $H_2SO_4$ solution | CSC, CHC, EAC, CCB |
| $Al_2S_3$ | $H_2SO_4$ | C-CNT, CCF, CGF, CC-PF |
| $SnS_2$ | $HNO_3$ and HCl | C-coke, A-MC, MC, ES-NF, VG-CNF, VG-GNF |
| SnS | HCl | C-coke, A-MC, MC, ES-NF, VG-CNF, VG-GNF | drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+\rightarrow(x-1) S+H_2S$.

Comparative Example 18B

Redox Chemical Reaction-Induced Deposition of Sulfur Particles in CNTs and Activated Carbon Mats (Chemically Treated or Un-Treated)

In this chemical reaction-based deposition process, sodium thiosulfate ($Na_2S_2O_3$) was used as a sulfur source and HCl as a reactant. A CNT-water or AC-water suspension was prepared and then the two reactants (HCl and $Na_2S_2O_3$) were poured into this suspension. The reaction was allowed to proceed at 25-75° C. for 1-3 hours, leading to the precipitation of S particles deposited in or on CNTs or ACs. The reaction may be represented by the following reaction: $2HCl+Na_2S_2O_3\rightarrow 2 NaCl+S\downarrow+SO_2\uparrow+H_2O$.

Comparative Example 18C

Preparation of S/MC and S/CB Nanocomposites Via Solution Deposition

Meso-porous carbon, chemically treated or untreated, (and, separately, carbon black particles) and S were mixed and dispersed in a solvent ($CS_2$) to form a suspension. After thorough stirring, the solvent was evaporated to yield a solid nanocomposite, which was then ground to yield nanocomposite powder. The primary sulfur particles in these nanocomposite particles have an average diameter of approximately 10-30 nm.

Comparative Examples 18 D

Preparation of Sulfur-Coated Webs for Cathodes

The step involves deposition of elemental sulfur on meso-porous structures through, for instance, a sublimation-based physical vapor deposition. Sublimation of solid sulfur occurs at a temperature greater than 20° C., but a significant sublimation rate typically does not occur until the temperature is above 40° C. In a typical procedure, a meso-porous structure or nano-filament web is sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, most preferred lower than 10 nm or even 5 nm.

Several series of alkali metal and alkali metal-ion cells were prepared using the presently prepared cathode. For instance, for the Li—S cells, the first series is a Li metal cell containing a copper foil as an anode current collector and the second series is also a Li metal cell having a nano-structured anode of conductive filaments (based on electro-spun carbon fibers) plus a copper foil current collector. The third series is a Li-ion cell having a nano-structured anode of conductive filaments (based on electro-spun carbon fibers coated with a thin layer of Si using CVD) plus a copper foil current collector. The fourth series is a Li-ion cell having a graphite-based anode active material as an example of the more conventional anode.

Comparative Examples 18E

Mixing of Polysulfide with Soft Carbon or Carbon Black Particles Via Ball-Milling Polysulfide particles and soft carbon (0% to 49% by weight of equivalent S content in the resulting composite) were physically blended and then subjected to ball milling for 2-24 hours to obtain polysulfide-SC composite particles (typically in a ball or potato shape). For comparison, untreated or chemically treated SC particles only (without polysulfide) were also ball-milled to obtain ball- or potato-shaped particles. The particles, containing various S contents, were then made into a layer of porous structure intended for use in the cathode. Another series of samples for comparison were made under similar processing conditions, but with carbon black particles replacing SC particles.

Example 19

Some Examples of Electrolytes Used in the Magnesium-Sulfur Cells

A wide range of lithium salts can be dissolved in a wide array of solvents, individually or in a mixture form. In the present study, the most preferred salt/solvent combinations include $Mg(AlCl_2EtBu)_2$/THF, $Mg(ClO_4)_2$/THF, EMIC, $Mg(ClO_4)_2$/PC, and $Mg(ClO_4)_2$/THD, a recrystallized Mg complex $[Mg_2(\mu-Cl)_3(THF)_6][HMDS-AlCl_3]$, $(HMDS)_2Mg$/diglyme, $(HMDS)_2Mg$/tetraglyme, and $(Mg(BBu_2Ph_2)_2$/THF, wherein HMDS=hexamethyldisilazide, PC=propylene carbonate, Bu=butyl, Ph=phenyl, and THF=tetrahydrofuran.

Another well-studied group of electrolytes are solutions of organomagnesium halides, amidomagnesium halides, and magnesium organoborates in a variety of solvents (e.g. THF, or ethereal), and Grignard solutions (RMgX in ethers, R=organic alkyl or aryl group and X=halide like Cl or Br). Useful solutions were produced by reacting $AlCl_{(3-n)}R_n$ Lewis acid with $R_2Mg$ Lewis base in ethers (THF or glymes) at various ratios. All phenyl complex (APC) electrolyte solutions (e.g. in THF), comprising the products of the reaction between $PhxMgCl_{(2-x)}$ and $PhyAlCl_{(3-y)}$ (preferably PhMgCl and $AlCl_3$), are good electrolytes.

Magnesium organohaloaluminate electrolytes, produced in situ from the reaction between a Lewis acid and a Lewis base (e.g. a 2:1 mixture of phenylmagnesium chloride and aluminum trichloride ($AlCl_3$) in THF) was also used. In addition, hexamethyldisilazide magnesium chloride (HMDSMgCl) was also used in the Mg—S cell.

Example 20

Evaluation of Electrochemical Performance of Various Mg—S Cells

Charge storage capacities were measured periodically and recorded as a function of the number of cycles. The specific discharge capacity herein referred to is the total charge inserted into the cathode during the discharge, per unit mass of the composite cathode (counting the weights of the cathode active material, conductive additive or porous structure, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Active material utilization efficiency data from many samples or cells investigated are summarized in Table 2 and Table 3 below:

2) For all the cathode porous materials investigated, the presently invented method of $M_xS_y$ deposition is significantly more effective than all conventional methods of direct deposition of sulfur per se into a porous structure or direct mixing of either S or $M_xS_y$ with a conductive filler to form a cathode structure (e.g. using PVD deposition, ball-milling, chemical reaction-based deposition, solution-based deposition, etc.) in terms of imparting S utilization efficiency to the resulting cathode structure of a M-S cell.

TABLE 2

Sulfur utilization efficiency data for Mg-Si metal-sulfur cell cathodes containing various S contents, polysulfide coating thicknesses or particle diameters, porous structure materials.

| Sample ID | Cathode active layer material | Equivalent S % (assuming 100% conversion from $M_xS_y$ to S) and polysulfide thickness or diameter (nm) | Cathode discharge capacity (mAh/g) | Discharge capacity, mAh/g (S weight) | Active material utilization efficiency |
|---|---|---|---|---|---|
| PG-1 | Pristine graphene | $Li_2S_{10}$; 90%S; 7.3 nm | 1376 | 1529 | 91.28% |
| PG-2 | Pristine graphene | $Li_2S_{10}$; 90% S; 13.3 nm | 1293 | 1437 | 85.77% |
| PG-3 | Pristine graphene | $Li_2S_{10}$; 75% S; 13.4 nm | 1035 | 1380 | 82.39% |
| PG-C-1 | Pristine graphene | 75% S (PVD) + PG | 663 | 884 | 52.78% |
| PG-C-2 | Pristine graphene | 75% S; $Li_2S_{10}$ + PG; ball-milled | 694 | 925 | 55.24% |
| PG-C-3 | Carbon black | 75% S; $Li_2S_{10}$ + CB; ball-milled | 420 | 560 | 33.43% |
| RGO-1 | RGO | $Li_2S_6$; 85% S; 13.4 nm | 1180 | 1388 | 82.88% |
| RGO-1C | RGO | 85% S, Chem. reaction | 928 | 1092 | 65.18% |
| RGO-2 | RGO | $Na_2S_6$; 85% S; 13.4 nm | 1120 | 1318 | 78.67% |
| RGO-2C | RGO | $Na_2S_6$; 85% S; ball-milled | 972 | 1144 | 68.27% |
| NGO-1 | NGO | $Na_2S_4$; 65% S; 13.4 nm | 887 | 1365 | 81.47% |
| NGO-2 | NGO | $K_2S_6$; 65% S; 10.2 nm | 860 | 1323 | 78.99% |
| f-GO-1 | f-GO | $K_2S_8$; 70% S; 10.2 nm | 989.3 | 1413 | 84.38% |
| EG-1 | Exfoliated graphite worms | $Li_2S_8$; 85%S; 7.6 nm | 1286 | 1513 | 90.32% |
| EG-2 | Exfoliated graphite worms | $Na_2S_6$; 85% S; 15.4 nm | 1172 | 1379 | 82.32% |
| EG-3 | Exfoliated graphite worms | $K_2S_6$; 85% S; 14.4 nm | 1164 | 1369 | 81.76% |
| EG-3C | CNT | $Na_2S_6$; 85% S; 34 nm | 940 | 1106 | 66.02% |

TABLE 3

Active material utilization efficiency data for Mg-S cell cathodes containing various S contents, polysulfide coating thicknesses or particle diameters, porous structure materials.

| Sample ID | Cathode active layer material | Equivalent S % (assuming 100% conversion from $M_xS_y$ to S) and polysulfide thickness or diameter (nm) | Cathode discharge capacity (mAh/g) | Discharge capacity, mAh/g (S weight) | Active material utilization efficiency |
|---|---|---|---|---|---|
| CSC-1 | CSC | $Li_2S_{10}$; 90%S; 8.4 nm | 1348 | 1498 | 89.42% |
| CSC-2 | CSC | $Li_2S_{10}$; 90% S; 15.3 nm | 1287 | 1430 | 85.37% |
| CSC-3 | CSC | $Li_2S_{10}$; 75% S; 16.2 nm | 1028 | 1371 | 81.83% |
| CSC-c1 | CSC | 75% S (PVD) + CSC | 658 | 877 | 52.38% |
| CSC-c2 | CSC | 75% S; $Li_2S_{10}$ + CSC; ball-milled | 712 | 949 | 56.68% |
| CHC-1 | CHC | $Li_2S_6$; 85% S; 13.4 nm | 1038 | 1483 | 88.53% |
| CHC-c1 | CHC | 85% S, Chem reaction | 940 | 1343 | 80.17% |
| EAC-1 | EAC | $Na_2S_6$; 85% S; 13.4 nm | 1014 | 1449 | 86.48% |
| EAC-c1 | EAC | $Na_2S_6$; 85% S; ball-milled | 880 | 1257 | 75.05% |
| C-CNT1 | C-CNT | $Na_2S_4$; 65% S; 13.4 nm | 999 | 1427 | 85.20% |
| C-CNT2 | C-CNT | $K_2S_6$; 65% S; 11.2 nm | 978 | 1397 | 83.41% |
| C-CNF | C-CNF | $K_2S_8$; 65% S; 14.4 nm | 964 | 1377 | 82.22% |
| A-MC1 | A-MC | $Li_2S_8$; 85%S; 7.6 nm | 1208 | 1421 | 84.85% |
| A-MC2 | A-MC | $Na_2S_6$; 85% S; 15.4 nm | 1187 | 1396 | 83.37% |
| A-MC3 | A-MC | $K_2S_6$; 85% S; 26.4 nm | 1033 | 1215 | 72.55% |
| M-NW | Ag NW | $Na_2S_6$; 85% S; 34 nm | 1130 | 1228 | 73.33% |

The following observations can be made from the data of Table 2 and Table 3:

1) Thinner $M_xS_y$ coatings prepared according to the instant invention lead to higher active material utilization efficiency in the Mg—S cell, given comparable S proportion.

3) Chemically treated or activated carbon materials are more effective than their non-treated counterparts. In addition, graphene and exfoliated graphite materials are very good materials for constituting a porous structure to accommodate $M_xS_y$.

4) Smaller or thinner particles or coating give rise to a higher cathode active material utilization efficiency.
5) The inventive method is capable of depositing a high $M_xS_y$ proportion while maintaining a thin $M_xS_y$ coating (hence, high active material utilization efficiency). Prior art methods are not capable of achieving both.

Figure 6:
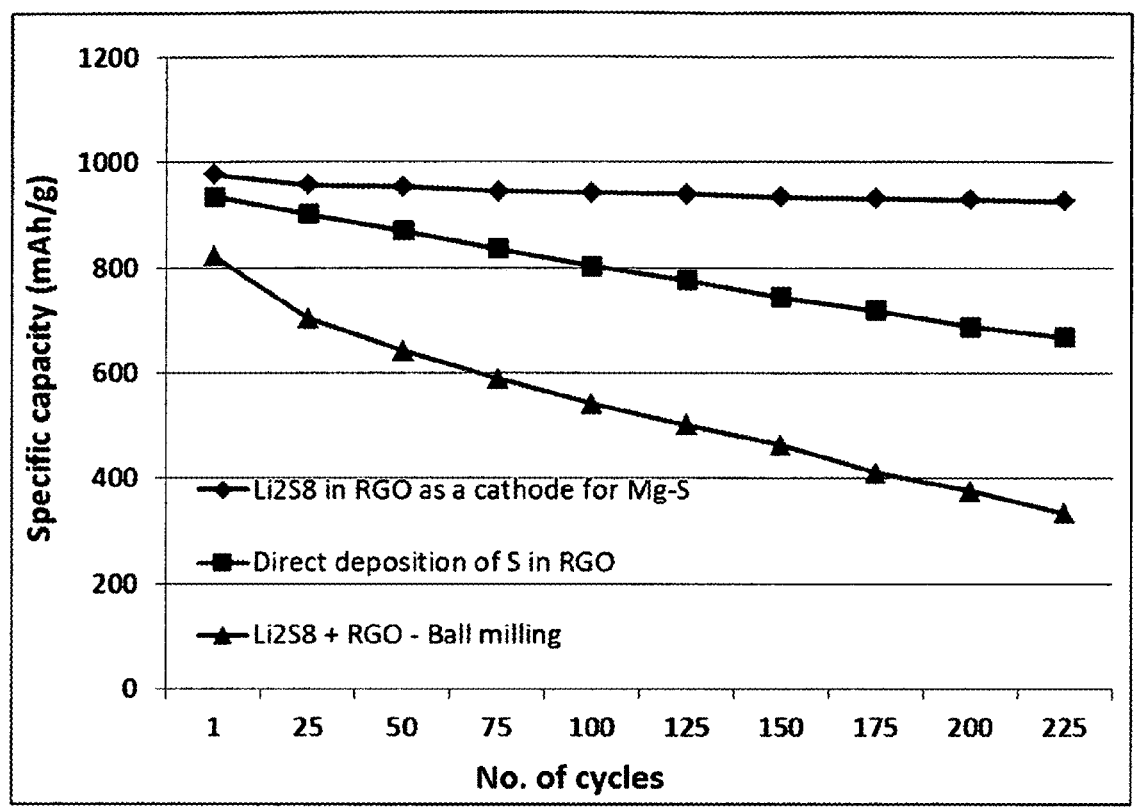
FIG. 6 The specific capacities (vs. number of charge/discharge cycles) for 3 Mg—S cells: one featuring a reduced graphene oxide (RGO)-based cathode containing solution deposited Li$_2$S$_8$ coating of the present invention, one containing chemically deposited sulfur in RGO, one containing a cathode containing RGO and Li$_2$S$_8$ that are ball-milled together.

Shown in FIG. 6 are the specific capacities vs. number of charge/discharge cycles for three Mg—S cells: one featuring a reduced graphene oxide (RGO)-based cathode containing solution deposited $Li_2$% coating of the present invention, one containing chemically deposited sulfur (not metal polysulfide) in RGO, one containing a cathode containing RGO and $Li_2S_8$ ball-milled together.

These data indicate that the presently invented Mg—S cell does not exhibit any significant decay (only 5.1%) after 225 cycles. In contrast, the Mg—S cell containing chemically deposited S coating-based cathode suffers a 28.6% capacity decay after 225 cycles. These results are quite unexpected considering that the same type of porous graphene structure was used as the supporting material for the cathode active material and the same equivalent amount of sulfur was deposited in these two cell cathodes. The cathode containing ball-milled mixture of RGO and $Li_2S_8$ suffers a 59.3% capacity decay after 225 cycles.

Figure 7:
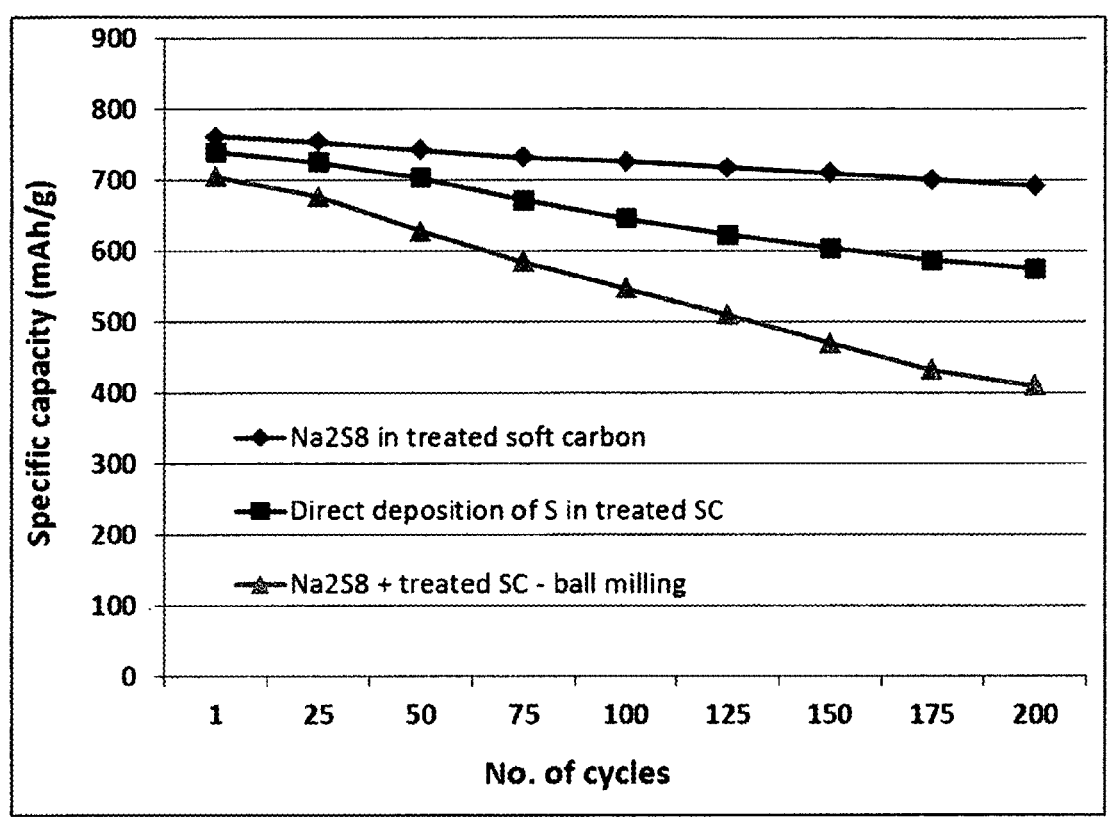
FIG. 7 The specific capacities (vs. number of charge/discharge cycles) for 3 Mg—S cells: one featuring a chemically treated soft carbon (C—SC)-based cathode containing solution deposited Na$_2$S$_8$ coating of the present invention, one containing chemically deposited sulfur in C—SC, one containing a cathode containing C—SC and Na$_2$S$_8$ ball-milled together.

The cycling stability of the cathode featuring nano $Li_2S_8$-preloaded RGO might be due to the effectiveness of the presently invented deposition method to uniformly deposit ultra-thin sulfide coating in the meso-pores in the porous structure. This sulfide was then converted to a uniform thin coating after the battery was fabricated and operation began. Such an approach appears to also impart an outstanding ability of the pore walls to retain thin sulfur coating, preventing dissolution of sulfur and polysulfide during battery charge/discharge operations. Additionally, as compared to pure S directly loaded in the cathode, the $Li_2S_8$ coating appears to be more resistant to electrode disintegration caused by cathode volume changes. This is likely due to the notion that a $M_xS_y$-preloaded cathode layer has already naturally built in some expanded volume and hence is less prone to sulfur volume expansion-induced damage upon repeated charges/discharges Similarly, FIG. 7 shows the specific capacities (vs. number of charge/discharge cycles) for 3 Mg—S cells: one featuring a chemically treated soft carbon (C—SC)-based cathode containing solution deposited $Na_2S_8$ coating of the present invention (pre-loaded $Na_2S_8$ was converted to S during first charge/discharge operation of the cell), one containing chemically deposited sulfur in C—SC, one containing a cathode containing C—SC and $Na_2S_8$ ball-milled together. The presently invented $M_xS_y$ pre-loading approach provides the most cycling-stable Mg—S cell.

Figure 8:
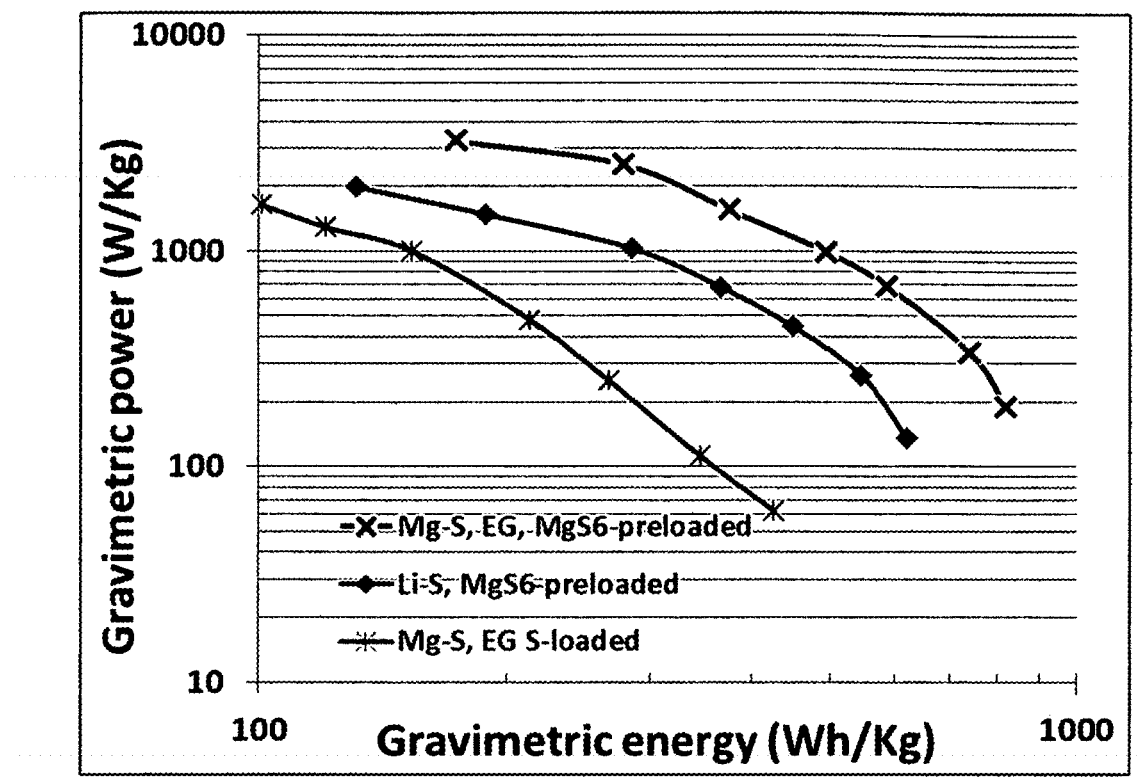
FIG. 8 Ragone plots (power density vs. energy density) of three cells: a Mg—S cell featuring a MgS$_6$-preloaded exfoliated graphite (EG) cathode layer, a corresponding Li—S cell, and a Mg—S cell featuring an EG cathode layer containing solution-deposited sulfur.

FIG. 8 shows Ragone plots (power density vs. energy density) of three cells: a Mg—S cell featuring a $MgS_6$-preloaded exfoliated graphite (EG) cathode layer, a corresponding Li—S cell, and a Mg—S cell featuring a cathode layer containing solution-deposited sulfur. These diagrams indicate that the presently invented metal polysulfide-preloaded cathode approach is significantly more effective in providing the Mg—S cell with a high power density and high energy density as compared to the conventional approach that directly loads S in the cathode. The Mg—S cell exhibits significantly higher energy density and power density than the Li—S cell made according to the same polysulfide-preloading approach.

In summary, the present invention provides an innovative, versatile, and surprisingly effective platform materials technology that enables the design and manufacture of superior magnesium-sulfur rechargeable batteries. The Mg—S cell featuring a cathode containing a conductive, meso-porous structure with ultra-thin $M_xS_y$ pre-loaded thereon exhibits several unexpected characteristics: a high cathode active material utilization rate, high specific capacity, high energy density, high power density, little or no shuttling effect, and long cycle life.

The invention claimed is:

1. A rechargeable magnesium-sulfur cell comprising an anode active material layer, an optional anode current collector, a porous separator and/or an electrolyte, a metal polysulfide-preloaded active cathode layer, and an optional cathode current collector, wherein said metal polysulfide-preloaded active cathode layer comprises:
   (A) an integral porous structure of an electronically conductive material, wherein said integral porous structure has massive surfaces having a specific surface area greater than 100 $m^2/g$ or has pores with a size from 1.0 nm to 100 nm and wherein multiple particles, platelets or filaments of said conductive material form a 3-D network of electron-conducting paths; and
   (B) a sulfur-rich metal polysulfide, $M_xS_y$, preloaded in said pores or deposited on said massive surfaces, wherein x is an integer from 1 to 3 and y is an integer from 1 to 10, and M is a metal element selected from an alkali metal, an alkaline metal, a transition metal, a metal from groups 13 to 17 of the periodic table, or a combination thereof;
   wherein said metal polysulfide is in a form of solid-state thin coating or small particles with a thickness or diameter less than 50 nm and occupies a weight fraction of from 1% to 99% of the total weight of said porous structure and said metal polysulfide combined.

2. The rechargeable magnesium-sulfur cell of claim 1, wherein said metal element M is selected from Li, Na, K, Mg, Ca, Zn, Cu, Ti, Ni, Co, Fe, Mn, Mo, Nb, Ta, Zr, or Al.

3. The rechargeable magnesium-sulfur cell of claim 1, wherein said $M_xS_y$ is selected from $Li_2S$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S$, $K_2S_2$, $K_2S_3$, $K_2S_4$, $K_2S_5$, $K_2S_6$, $K_2S_7$, $K_2S_8$, $K_2S_9$, $K_2S_{10}$, MgS, $MgS_2$, $MgS_3$, $MgS_4$, $MgS_5$, $MgS_6$, $Mo_6S_8$, $Nb_6S_8$, $Zr_6S_8$, or $Ta_6S_8$.

4. The rechargeable magnesium-sulfur cell of claim 1, wherein said $M_xS_y$ is loaded in said pores or on said massive surfaces after said integral porous structure is made and before said cell is made.

5. The rechargeable magnesium-sulfur cell of claim 1, wherein said integral porous structure is a meso-porous structure formed of multiple particles, platelets, or filaments of a carbon, graphite, metal, or conductive polymer, wherein said meso-porous structure has meso-scaled pores of 2-50 nm and a specific surface area greater than 100 $m^2/g$ and wherein said carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, activated meso-phase carbon, meso-porous carbon, electro-spun conductive nano fiber, highly separated vapor-grown carbon or graphite nano fiber, highly separated carbon nano-tube, carbon nanowire, metal nano wire, metal-coated nanowire or nano-fiber, conductive polymer-coated nanowire or nano-fiber, or a combination thereof, and wherein said particles or fibrils are optionally bonded to form said porous structure by a binder of from 0% to 30% by weight of a total porous structure weight not counting the metal polysulfide weight.

6. The rechargeable magnesium-sulfur cell of claim 1, wherein said integral porous structure is a porous graphene structure containing a graphene material or an exfoliated graphite material wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof and wherein the exfoliated graphite material is selected from exfoliated graphite worms, expanded graphite flakes, or recompressed graphite worms or flakes, and wherein said graphene structure comprises multiple sheets of said graphene material or multiple flakes of said exfoliated graphite material that are intersected or interconnected to form said integral layer with or without a binder to bond said multiple sheets or flakes together, wherein said binder is from a resin, a conductive polymer, coal tar pitch, petroleum pitch, meso-phase pitch, coke, or a derivative thereof and occupies from 0% to 30% by weight of a total porous graphene structure weight not counting the metal polysulfide weight.

7. The rechargeable magnesium-sulfur cell of claim 1, wherein said integral porous structure is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nanowire mat, surface-passivated porous metal, porous conductive polymer film, conductive polymer nano-fiber mat or paper, conductive polymer foam, carbon foam, graphitic foam, carbon aerogel, carbon xerox gel, or a combination thereof.

8. The rechargeable magnesium-sulfur cell of claim 1, which is a free-standing layer or is physically or chemically bonded to a current collector layer prior to being incorporated into said magnesium-sulfur cell.

9. The rechargeable magnesium-sulfur cell of claim 1, further comprising an element Z or a metal compound $M_xZ_y$ deposited in said porous or on said massive surfaces wherein said element Z or $M_xZ_y$ is mixed with said metal polysulfide or formed as discrete coating or particles having a dimension less than 100 nm and said Z element is selected from Sn, Sb, Bi, Se, and/or Te, and wherein x is an integer from 1 to 3, y is an integer from 1 to 10, and M is a metal element selected from an alkali metal, an alkaline metal, a transition metal, a metal from groups 13 to 17 of the periodic table, or a combination thereof, and the weight ratio of $Z/M_xS_y$ or $M_xZ_y/M_xS_y$ is less than 1.

10. The rechargeable magnesium-sulfur cell of claim 1, wherein said metal polysulfide occupies a weight fraction of at least 70% of the total weight of said porous structure and said metal polysulfide combined.

11. The rechargeable magnesium-sulfur cell of claim 1, wherein said metal polysulfide occupies a weight fraction of at least 90% of the total weight of said porous structure and said metal polysulfide combined.

12. The rechargeable magnesium-sulfur cell of claim 1, wherein said metal polysulfide thickness or diameter is smaller than 20 nm.

13. The rechargeable magnesium-sulfur cell of claim 1, wherein said metal polysulfide thickness or diameter is smaller than 10 nm.

14. The rechargeable magnesium-sulfur cell of claim 1, wherein said integral porous structure has massive surfaces having a specific surface area greater than 500 $m^2/g$.

15. The rechargeable magnesium-sulfur cell of claim 1, wherein said integral porous structure has massive surfaces having a specific surface area greater than 700 $m^2/g$.

16. The rechargeable magnesium-sulfur cell of claim 1, wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

17. The rechargeable magnesium-sulfur cell of claim 1, wherein said electrolyte contains a salt or salt/solvent solution selected from:
(a) $Mg(AlCl_2EtBu)_2$/THF, $Mg(ClO_4)_2$/THF, $Mg(ClO_4)_2$/PC, $Mg(ClO_4)_2$/THF, a recrystallized Mg complex $[Mg_2(\mu-Cl)_3(THF)_6][HMDS-AlCl_3]$, $(HMDS)_2Mg$/diglyme, $(HMDS)_2Mg$/tetraglyme, or $(Mg(BBu_2Ph_2)_2$/THF, wherein HMDS=hexamethyldisilazide, PC=propylene carbonate, Bu=butyl, Ph=phenyl, and THF=tetrahydrofuran;
(b) a solution of an organomagnesium halide, amidomagnesium halide, or a magnesium organoborate;
(c) a Grignard solution, RMgX in an ether, wherein R=organic alkyl or aryl group and X=a halide element;
(d) a reaction product of a $AlCl_{(3-n)}R_n$ Lewis acid with a $R_2Mg$ Lewis base in an ether;
(e) a solution comprising a product of the reaction between $PhxMgCl_{(2-x)}$ and $PhyAlCl_{(3-y)}$; or
(f) a mixture of phenylmagnesium chloride and aluminum trichloride, $AlCl_3$, in THF.

18. The rechargeable magnesium-sulfur cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$, Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

19. The rechargeable magnesium-sulfur cell of claim 1, wherein said electrolyte contains a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

20. The rechargeable magnesium-sulfur cell of claim 1, wherein said anode active material layer contains an anode active material selected from pure Mg metal having a Mg content no less than 99.9%, or a Mg alloy or compound having a Mg content from 70% by weight to 99.9% by weight.

21. The rechargeable magnesium-sulfur cell of claim 1 wherein said cathode has an active material utilization efficiency no less than 80%.

22. The rechargeable magnesium-sulfur cell of claim 1 wherein said cathode has an active material utilization efficiency no less than 90%.

\* \* \* \* \*